(12) United States Patent
Kovach et al.

(10) Patent No.: US 10,530,584 B2
(45) Date of Patent: Jan. 7, 2020

(54) SYSTEMS AND METHODS FOR TRACKING CONTROLLED ITEMS

(71) Applicants: Aram Kovach, Westerville, OH (US); Garrett Greenlee, Columbus, OH (US); Gabriel Ronai, Szodliget (HU)

(72) Inventors: Aram Kovach, Westerville, OH (US); Garrett Greenlee, Columbus, OH (US); Gabriel Ronai, Szodliget (HU)

( * ) Notice: Subject to any disclaimer, the term of this patent is extended or adjusted under 35 U.S.C. 154(b) by 595 days.

(21) Appl. No.: 15/196,506

(22) Filed: Jun. 29, 2016

(65) Prior Publication Data

US 2018/0004682 A1    Jan. 4, 2018

(51) Int. Cl.
*H04L 9/32* (2006.01)

(52) U.S. Cl.
CPC .................................. *H04L 9/3242* (2013.01)

(58) Field of Classification Search
CPC ......... G06F 12/1408; G06F 2212/1052; H04L 9/3242
See application file for complete search history.

(56) References Cited

U.S. PATENT DOCUMENTS

| | | | |
|---|---|---|---|
| 7,395,402 B2 * | 7/2008 | Wilson | G06F 11/1076 711/162 |
| 8,077,041 B2 | 12/2011 | Stern et al. | |
| 8,135,688 B2 * | 3/2012 | Shankar | G06F 16/24554 707/696 |
| 8,386,966 B1 | 2/2013 | Attinasi et al. | |
| 2007/0260491 A1 * | 11/2007 | Palmer | G06F 19/3418 705/3 |
| 2008/0061979 A1 * | 3/2008 | Hause | G06Q 10/08 340/572.1 |
| 2011/0049862 A1 * | 3/2011 | Hill | G07D 7/0047 283/70 |
| 2012/0054917 A1 * | 3/2012 | Hanley | C12N 15/8261 800/290 |
| 2016/0321480 A1 * | 11/2016 | Hamlin | G16H 10/40 |
| 2017/0262862 A1 * | 9/2017 | Aljawhari | G06Q 30/0185 |

OTHER PUBLICATIONS

Toh, Sing-Hui, Hoon-Jae Lee, and Kyeong-Hoon Do. "Basic sequence search by hashing algorithm in DNA sequence databases." Advanced Communication Technology, 2009. ICACT 2009. 11th International Conference on. vol. 3. IEEE, 2009. (Year: 2009).*
Rebecca Hiscott, "RFID Tags Track Marijuana From Seed to Sale, in Colorado", https://mashable.com/2014/02/11/marijuana-rfid-tracking/ ; Feb. 11, 2014, pp. 1-13 (Year: 2014).*

* cited by examiner

*Primary Examiner* — Khalil Naghdali

(57) ABSTRACT

A method for tracking a controlled item can include transforming a genetic code with a cryptographic hash function into a core code. The core code can be associated with a label code and a weight. The weight can be indicative of a produced amount of the strain of the controlled item. An image of a label having an identification portion indicative of the label code and dispensed weight data can be received. The label code can be extracted from the identification portion of the image of the label. The weight associated with the core code can be reduced based upon the dispensed weight data.

16 Claims, 25 Drawing Sheets

FIG. 10

SYSTEMS AND METHODS FOR TRACKING CONTROLLED ITEMS

BACKGROUND

The present invention relates generally to an inventory management system and method and, more particularly, to a cloud-based validation, security and tracking system for a controlled item and method thereof.

Unless otherwise indicated herein, the materials described in this section are not prior art to the claims in this application and are not admitted to be prior art by inclusion in this section.

Various systems and methods have been employed to assist in the inventory management of a controlled item(s), such as drugs or medical supplies to be dispensed to patients of the medical facility, ammunition and military grade weapons to be dispensed to law enforcement agents, military personnel, and the likes. Such systems have a common goal of helping to maintain accurate records while attempting to reduce the burden of managing all of the information associated with the stocking and distribution of such control items. Such systems have been useful when applied in certain situations, but have been lacking in other areas.

For example, in efforts to affect control over grow operations and dispensaries of cannabis and cannabis based products, some states like Colorado impose strict rules requiring the tracking of individual cannabis plants each with a unique radio frequency identification (RFID) tags as well as the weighing and cataloging of all plant material, including freshly harvested (wet) cannabis. Law enforcement officers have been using such RFID systems to identify grow operations where there is an unusually high loss of marijuana between the growing, harvesting and processing steps. This is part of an effort to ensure that the cannabis industry is following guidelines set out by federal prosecutors to keep cannabis and cannabis based products from being diverted to the black market run by criminals and international drug cartels.

However, as such, RFID systems used in the cannabis industry to date have been basically similar to the systems employed in big-box stores, like Wal-Mart, Home Depot, etc. This methodology has been shown to be cumbersome, not cost efficient, and not particularly effective in accurately tracking the inventory of such controlled items. For example, reports of audit investigations, comparing the amount of cannabis a store has actually on hand with that read by the RFID system, in multiple cases found stores with far more cannabis than they were disclosing. By withholding plants from the tracking system, store owners can avoid paying taxes on those sales, which could also take place on the black market.

Accordingly, a need exists for an inventory management system for a controlled item that improves workflow validation, security, and tracking as well as cost efficiency to manage controlled items of any size volume or staffing level.

SUMMARY

In one embodiment, a method for tracking a controlled item can include providing a tracking server comprising one or more processors communicatively coupled to memory having a first memory partition and a second memory partition. The first memory partition can be segregated from the second memory partition. A genetic code of a strain of a controlled item can be transformed with a cryptographic hash function, automatically with the one or more processors, into a core code. The genetic code can be stored on the first memory partition and the core code can be stored on the second memory partition. The core code can be associated with a label code and a weight on the first memory partition. The weight can be indicative of a produced amount of the strain of the controlled item. An image of a label having an identification portion indicative of the label code and dispensed weight data can be received. The label code can be extracted, automatically with the one or more processors, from the identification portion of the image of the label. The weight associated with the core code can be reduced, automatically with the one or more processors, based upon the dispensed weight data.

In another embodiment, a system for tracking a controlled item can include a tracking server, and one or more client devices. The tracking server can include one or more processors communicatively coupled to memory. The one or more client devices communicatively coupled to the tracking server. The tracking server can execute machine readable instructions to transform with a cryptographic hash function a code comprising a genetic code of a strain of a controlled item into a core code. An image of a label having an identification portion indicative of a label code can be received from the one or more client device. Phase data indicative of a life cycle phase of the strain of the controlled item and quantity data indicative of an amount of the strain of the controlled item can be received from the one or more client device. The label code can be extracted from the identification portion of the image of the label. The core code can be associated with the label code, the first phase data, and the first quantity data on the memory. Subsequent phase data indicative of a subsequent life cycle phase of the strain of the controlled item and subsequent quantity data indicative of a subsequent amount of the strain of the controlled item can be received from the one or more client device. An acceptable amount of the strain of the controlled item can be determined based upon the quantity data and the subsequent phase data. An alert can be communicated to the one or more client device, if the subsequent quantity data is beyond the acceptable amount.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 10:
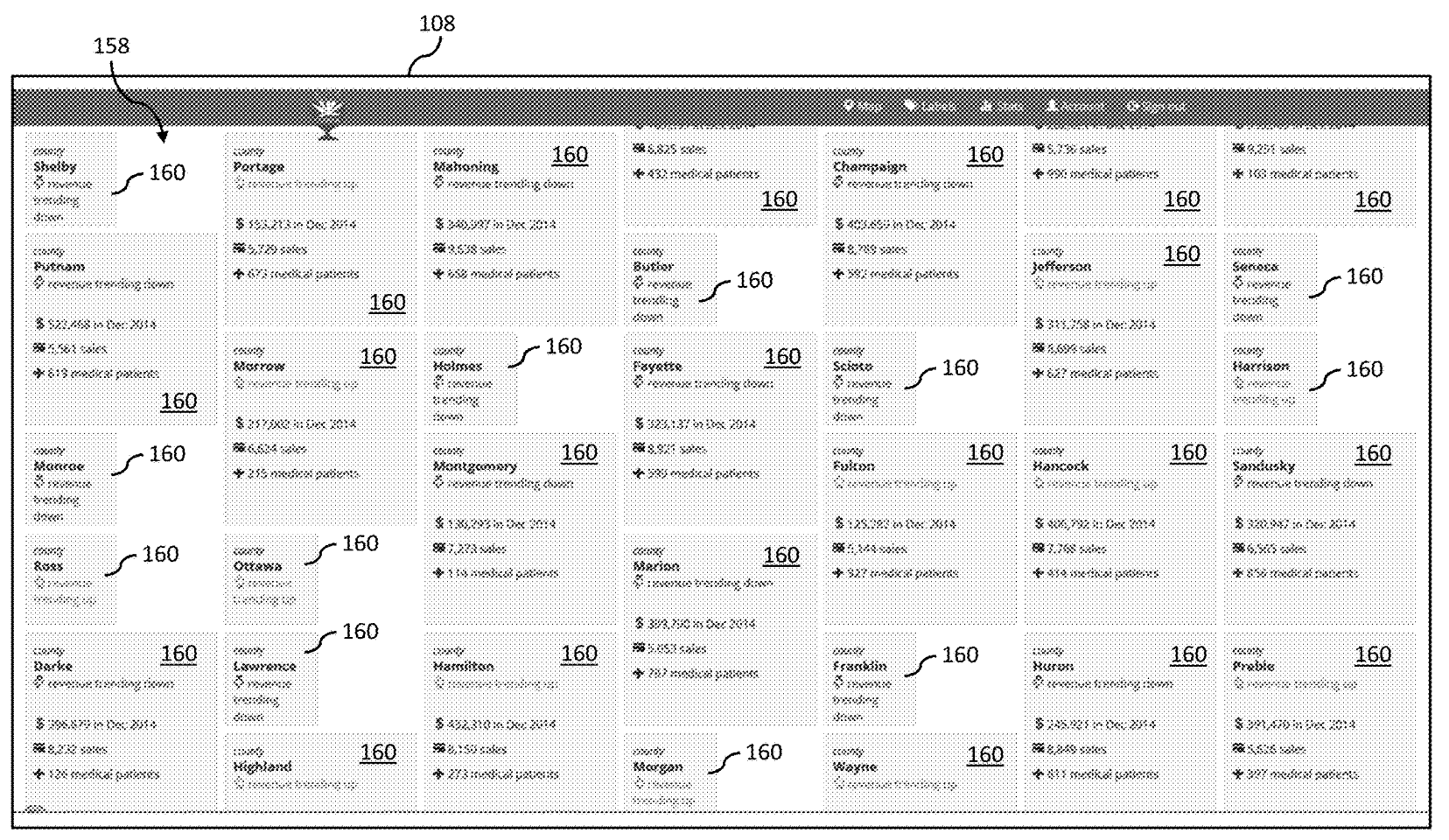

FIGS. 6-12 schematically depicts user interfaces for accessing administration portal functions according to one or more embodiments shown and described herein;

DETAILED DESCRIPTION

Figure 1:
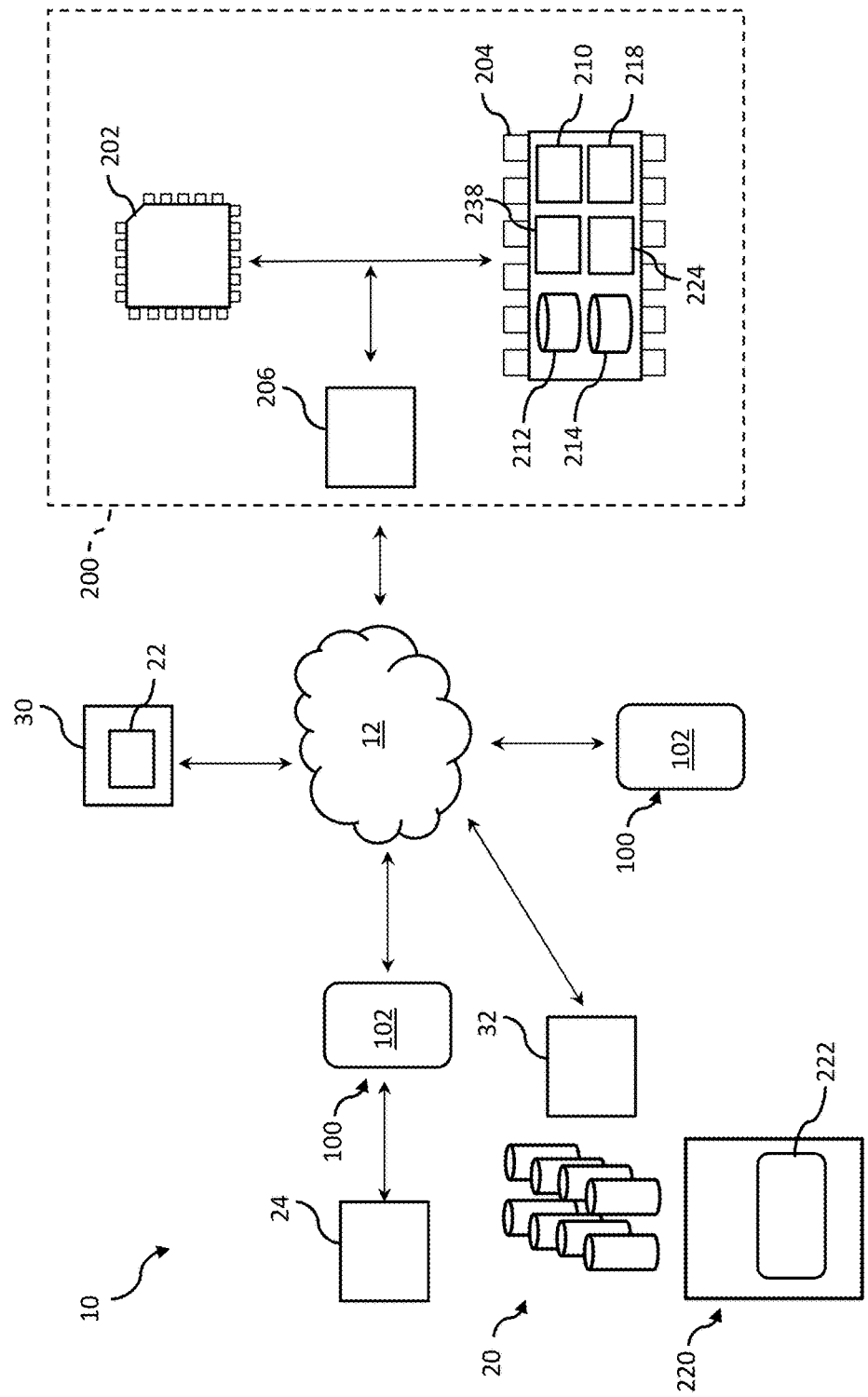
FIG. 1 schematically depicts a system for tracking controlled items according to one or more embodiments shown and described herein.

Referring to FIG. 1, a system 10 for tracking controlled items is schematically depicted. The system 10 can be used to implement the methods described herein. The system 10 can include one or more client device 100, an authentication server 200, and an analyzer apparatus 30. According to the embodiments described herein, the tracking server 200 can be configured as a cloud-based device to automatically validate, secure and track one or more controlled items.

Figure 2:
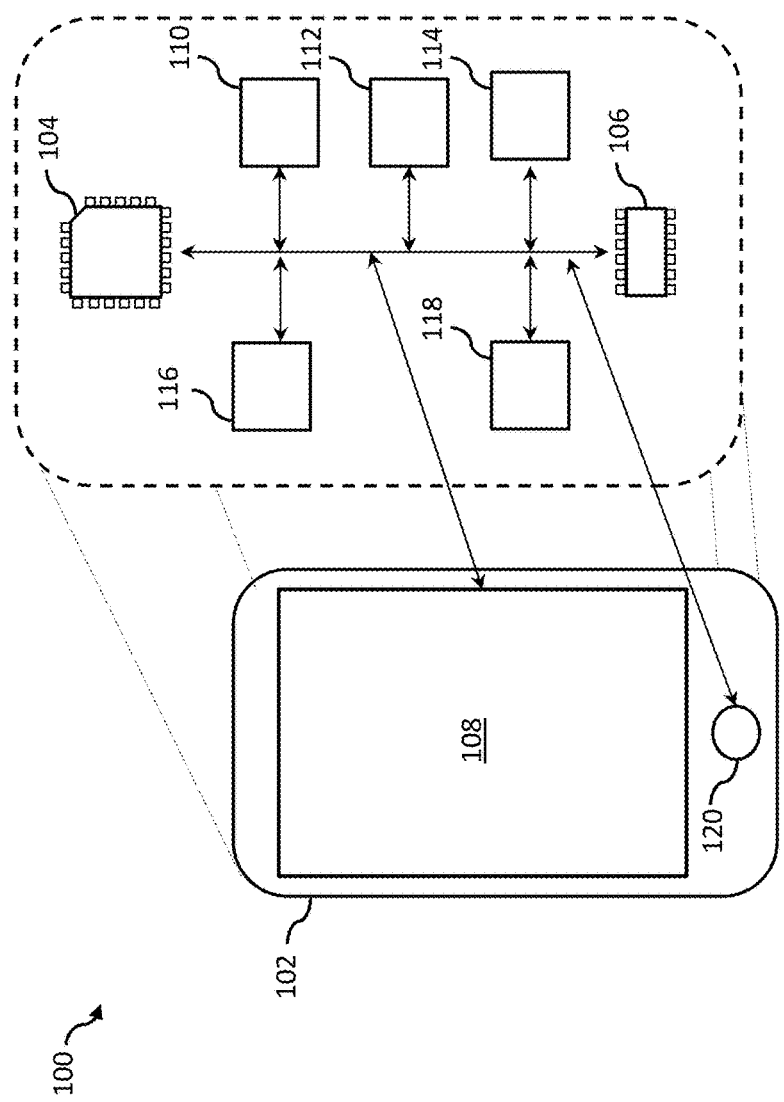
FIG. 2 schematically depicts a client device according to one or more embodiments shown and described herein.

Referring to FIG. 2, the client device 100 can comprise a smart phone 102. It is noted that the description provided herein regarding the smart phone 102 is for clarity, and is not intended to limit the description to any specific machine. Various machines can be utilized in the alternative or in addition to the smart phone 102 without departing from the scope of the embodiments described herein such as, for example, a mobile phone, a tablet, a laptop computer, desktop computer, or a specialized machine having communication capability. The smart phone 102 can comprise one or more processors 104 for executing machine readable instructions to perform functions according to the methods described herein. As used herein, the term "processor" can mean any device capable of executing machine readable instructions. Accordingly, each processor can be a controller, an integrated circuit, a microchip, or any other device capable of implementing logic. Specific examples of the one or more processors 104 can include a touch screen controller, a baseband controller, graphics processor, application processor, image processor, or the like.

The smart phone 102 can include memory 106 communicatively coupled to the one or more processors 104 (generally depicted as double arrowed lines). The memory 106 described herein may be RAM, ROM, a flash memory, a hard drive, or any device capable of storing machine readable instructions. Accordingly, the smart phone 102 can implement a mobile operating system as machine readable instructions stored on the memory 106 and executed by the one or more processors 104. Specific examples of mobile operating systems include, but are not limited to, Android, iOS, Blackberry OS, Windows Phone, Symbian, and the like.

Additionally, it is noted that the functions, modules, and processes described herein can be provided as machine readable instructions stored on memory 106 and executed by the one or more processors 104. The machine readable instructions can be provided in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein may be implemented in any conventional computer programming language, as pre-programmed hardware elements, or as a combination of hardware and software components.

The smart phone 102 can include a display 108 communicatively coupled to the one or more processors 104 for providing optical signals and conveying visual feedback to users of the smart phone 102. In some embodiments, the display 108 can be configured to selectively illuminate a plurality of pixels to provide the optical signals. Accordingly, the display can comprise light emitting diodes (LED or OLED), liquid crystal display (LCD), liquid crystal on silicon (LCOS), or the like. Additionally, the display 108 can be configured to operate as a touch screen for accepting tactile input via visual controls. Accordingly, the display 108 can include a touch detector such as, for example, a resistive sensor, capacitive sensor, or the like. It is noted that the term "signal," as used herein, can mean a waveform (e.g., electrical, optical, magnetic, or electromagnetic), such as DC, AC, sinusoidal-wave, triangular-wave, square-wave, and the like, capable of traveling through a medium. It should be understood that the term "optical" can refer to various wavelengths of the electromagnetic spectrum such as, but not limited to, wavelengths in the ultraviolet (UV), infrared (IR), and visible portions of the electromagnetic spectrum.

Referring still to FIG. 2, the smart phone 102 can include network interface hardware 110 communicatively coupled to the one or more processors 104 for communicatively coupling the smart phone 102 to another device via a network such as, for example, a wide area network, a local area network, personal area network, and combinations thereof. Accordingly, the network interface hardware 110 can be configured to communicate, i.e., send and/or receive data signals via any wired or wireless communication protocol. For example, the network interface hardware 110 can comprise an antenna, a modem, LAN port, wireless fidelity (Wi-Fi) card, WiMax card, near-field communication hardware, satellite communication hardware, or the like. Accordingly, the smart phone 102 can be communicatively coupled to a network via wires, via a wide area network, via a local area network, via a personal area network, via a satellite network, or the like. Suitable local area networks can include wired ethernet and/or wireless technologies such as, for example, Wi-Fi. Suitable personal area networks can comprise wireless technologies such as, for example, IrDA, BLUETOOTH, Wireless USB, Z-WAVE, ZIGBEE, or the like. Alternatively or additionally, suitable personal area networks can include wired computer buses such as, for example, USB and FIREWIRE. Thus, any components of the smart phone 102 can utilize one or more network components to communicate signals via the Internet 12 or World Wide Web.

The smart phone 102 can include radio frequency hardware (RF hardware) 112 communicatively coupled to the one or more processors 104 for communicatively coupling the smart phone 102 with a cellular network. Suitable cellular networks include, but are not limited to, technologies such as LTE, WiMAX, UMTS, CDMA, and GSM. In some embodiments, the RF hardware 112 can include components suitable for communicating voice information and data signals such as, for example, modems, attenuators, antennas, antenna switches, amplifiers, receivers, transceivers, or combinations thereof. Accordingly, the smart phone 102 described herein can utilize a cellular network to communicate signals over the Internet or World Wide Web.

The smart phone 102 can include a Global Positioning System (GPS) receiver 114 communicatively coupled to the one or more processors 102. The GPS receiver 114 can be configured to provide signals indicative of the location of the smart phone 102. Specifically, the GPS receiver 114 can receive signals encoded with location data, time data or both from a plurality of GPS satellites, when the GPS receiver 114 has an substantially unobstructed line of sight to the GPS satellites.

Referring still to FIG. 2, the smart phone 102 can include an optical sensor 116 communicatively coupled to the one or more processors 104 for detecting optical signals and encoding the detected signals into an image or collection of images (e.g., video). It should be understood that the term "optical" can refer to various wavelengths of the electromagnetic spectrum such as, but not limited to, wavelengths in the ultraviolet (UV), infrared (IR), and visible portions of the electromagnetic spectrum. In some embodiments, the optical sensor 116 can include semiconductor charge-coupled devices (CCD), complementary metal-oxide-semiconductors (CMOS), N-type metal-oxide-semiconductors (NMOS), or the like. Accordingly, one or more images can be captured by the optical sensor 116 and stored in the memory 106.

The smart phone 102 can include a biometric sensor 118 communicatively coupled to the one or more processors 104. The biometric sensor 118 can be configured to sense a physiological characteristic of a user and encode the characteristics into a signal indicative of the physiological characteristic. For example, the biometric sensor 118 can be configured to detect fingerprints. Accordingly, the biometric sensor 118 can include a fingerprint sensor such as, for example, an optical fingerprint sensor, an ultrasonic fingerprint sensor, a capacitive fingerprint sensor, or the like. The fingerprint sensor can be positioned at different locations on the smartphone 102 as a separate input component or integrated within an input component 120 such as, for example, a home button or as part of a touch screen sensor array of the display 108. Alternatively or additionally, the biometric sensor 118 can include other sensors such as, for example, a facial recognition sensor, a blood vessel sensor, a retinal sensor, a pore sensor, a voice recognition sensor, or the like. In other embodiments, the biometric sensor 118 can be implemented as a stand-alone electronic device (e.g., a finger biometric chip or chipset).

The smart phone 102 can include one or more input component 120 for sensing tactile input and encoding the input into a signal indicative of the input. Suitable examples of the input component 120 can include a microphone, a button, a knob, a switch, a resistive sensor, capacitive sensor, a microphone, a keyboard, or the like. Alternatively or additionally, the display 108 can be configured to receive user input and operate as the input component 120. In addition to the aforementioned components, the smart phone 102 can comprise one or more additional components communicatively coupled to the one or more processors 104 without departing from the scope of the embodiments described herein. Suitable additional components include, but are not limited to, speakers, accessory lights (e.g., LED), motion sensors, or the like.

Referring again to FIG. 1, embodiments of the present disclosure can use the tracking server 200 for hosting an enterprise application for automatically validating, securing, and/or tracking one or more controlled items 20. The tracking server 200 can include one or more processors 202 communicatively coupled to memory 204. The one or more processors 202 can also be communicatively coupled to network interface hardware 206. It is noted that, while the tracking server 200 is schematically depicted in FIG. 1 as being a single machine, each of the one or more processors 202, the memory 204, and the network interface hardware 206 can be distributed amongst a plurality of machines that are communicatively coupled to one another. Accordingly, the tracking server 200 can be scaled to include any number of machines suitable for supporting any number of client devices 100. In some embodiments, the one or more processors 202 can execute web server software provided as machine readable instructions that can be, for example, stored on the memory 204. Suitable web server software includes, but is not limited to, Apache HTTP Server, Internet Information Services, Nginx, Google Web Server, or the like. Accordingly, the tracking server 200 can use a server operating system such as, for example, Unix, Linux, BSD, Microsoft Windows, or the like. In some embodiments, the tracking server 200 can be configured to be communicatively coupled with the one or more client devices 100 over the internet 12.

The enterprise application can be read from the memory 20 and executed by the one or more processors 202. In some embodiments, the features of the enterprise application can be served to the one or more client devices 100 as an application running in a web browser. For example, the embodiments provided herein can be designed and implemented as a web-based application, hosted by the tracking server 200, utilizing a browser provided on the one or more client devices 100. Alternatively or additionally, the features of the enterprise application can be provided as a standalone application (applet, mobile app, etc.) configured to communicate with the tracking server 200. Access to the tracking server via the internet 12 can utilize a secure hypertext transfer protocol secure (HTTPS) for over-the-wire encryption to ensure data privacy, and to provide users with confirmation that the site providing the application is legitimate through the normal secure socket layer (SSL) handshaking protocols.

The system 10 can include an analyzer apparatus 30 configured to uniquely identify the composition of a controlled item 20. Optionally, the analyzer apparatus can be communicatively coupled to the tracking server 200 via the internet 12. The analyzer apparatus 30 can include a chemical compound analyzer in embodiments where the controlled item 20 comprises, for example, explosives or munitions. Alternatively or additionally, the analyzer apparatus 30 can include a Deoxyribonucleic acid (DNA) sequence analyzer in embodiments where the controlled item 20 comprises, for example, biological agents, genetically modified seed, livestock, cannabis plants, or the like. Accordingly, the analyzer apparatus 30 can output a code 22 corresponding the chemical composition or genetic code (e.g., DNA sequence) of the controlled item 20. The code 22 can be used to uniquely identify particular strains of the controlled item 20.

In some embodiments, the code 22 can comprise a genetic code. The genetic code can correspond to DNA sequence identification of STR (short term repeat) loci provided in a recognized DNA sequence format such as, for example, EMBL. For example, the analyzer apparatus 30 can be configured to generate the code 22 using a DNA sequence technique such as, but not limited to, fluorescence detection following electrophoretic separation. The code 22 can be used to uniquely identify strains of the controlled item 20. In some embodiments, closely related marijuana strains can be authenticated using STR loci, which can comprise short, repetitive sequence elements 3-7 base pairs in length. The repeats are well distributed throughout the cannabis genome and can be a source of highly polymorphic markers, which can be detected using the polymerase chain reaction. Alleles of STR loci can be differentiated by the number of copies of the repeat sequence contained within the amplified region and can be distinguished from one another using fluorescence detection following electrophoretic separation.

It is noted that plants with identical genetics can have widely different compound percentage formations. For example, two genetically similar OG Kush plants grown in different substrates, hydroponics vs. soil, in different grow environments (Temperature and CO2) can have substantially divergent Tetrahydrocannabinol (THC) and Cannabidiol (CBD) content. Additionally, the drying/curing climate for the final product can have a broad effect on compounds such as Cannabinol (CBN). In some embodiments, the analyzer apparatus 30 can be configured to perform a quantitative analysis such as, for example, gas or liquid chromatography, to identify the specific cannabinoids and their percentage concentrations. Accordingly, the code 22 can further include chemical concentration information.

Figure 3:
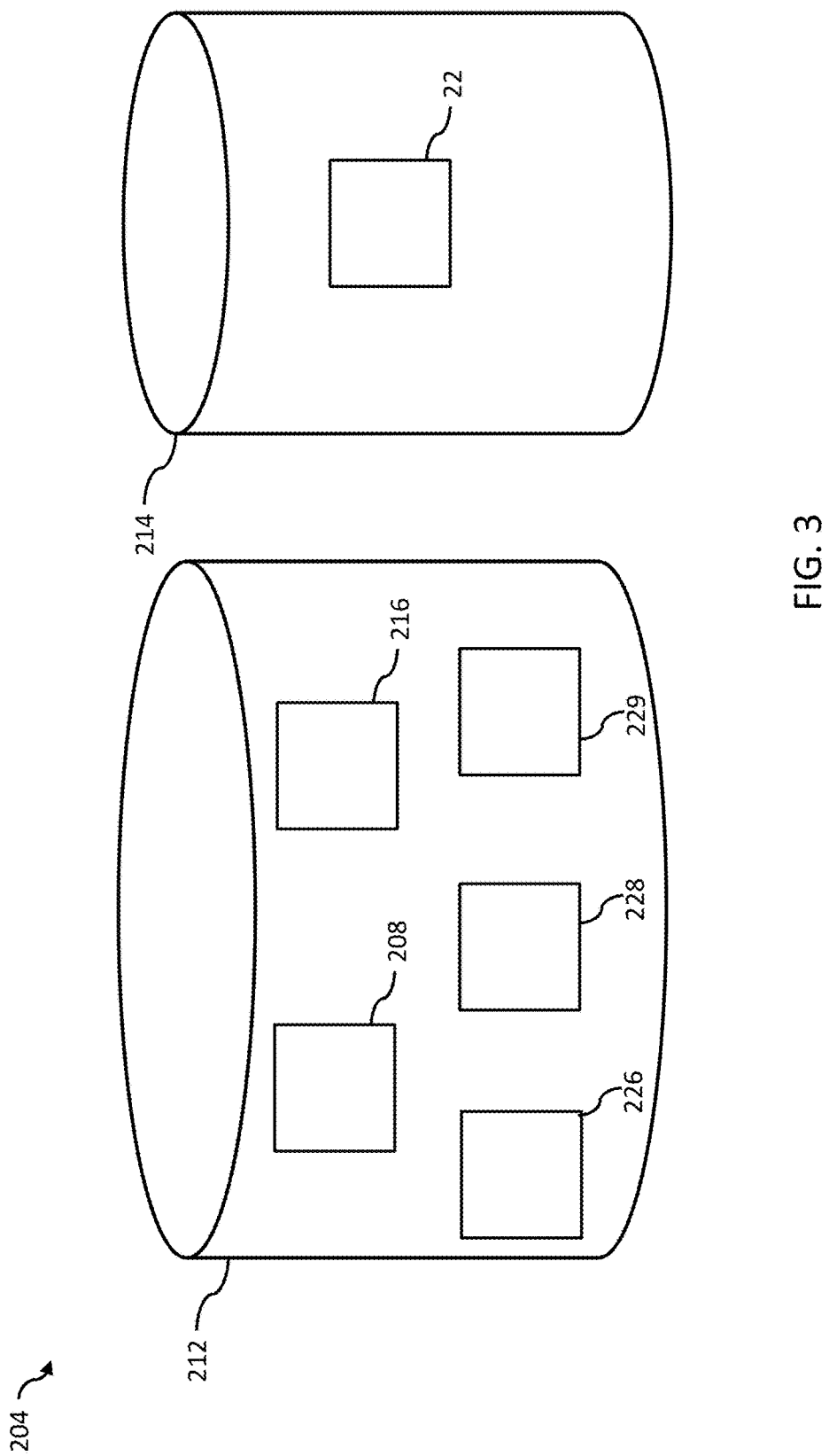
FIG. 3 schematically depicts memory of a tracking server according to one or more embodiments shown and described herein.
Figure 4:
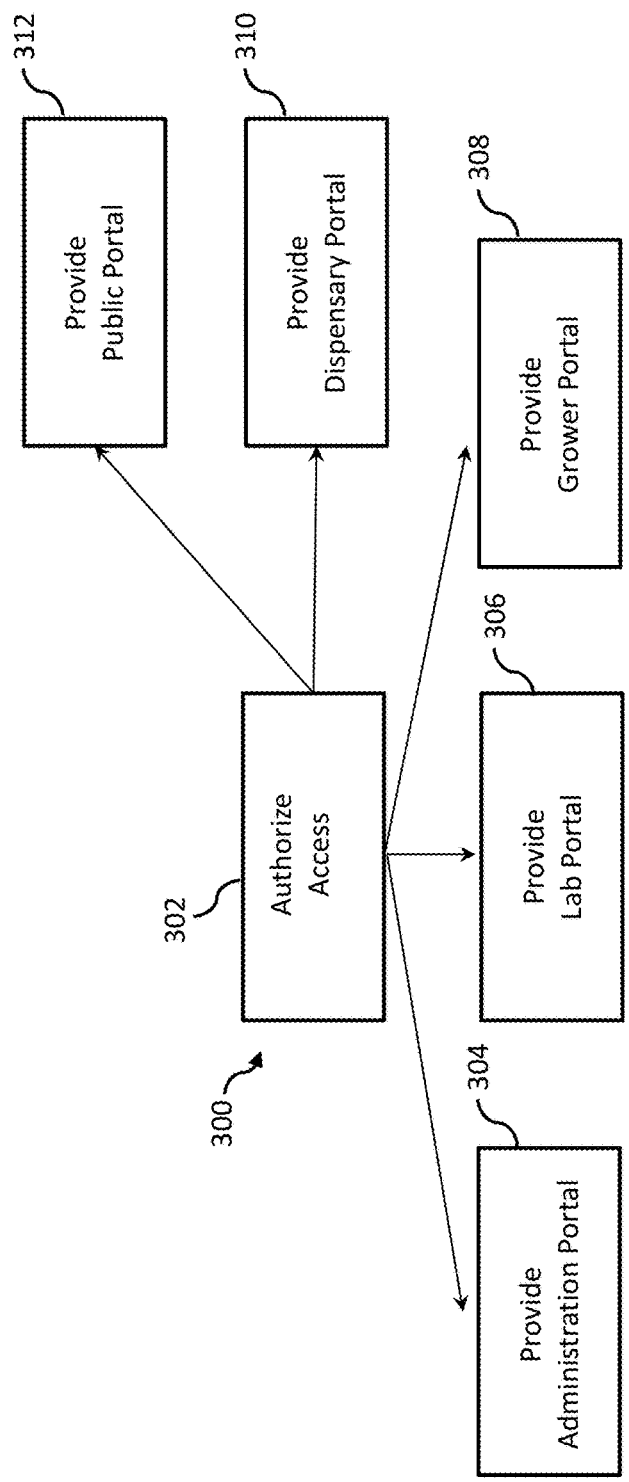
FIG. 4 schematically depicts a method for tracking controlled items according to one or more embodiments shown and described herein.
Figure 5:
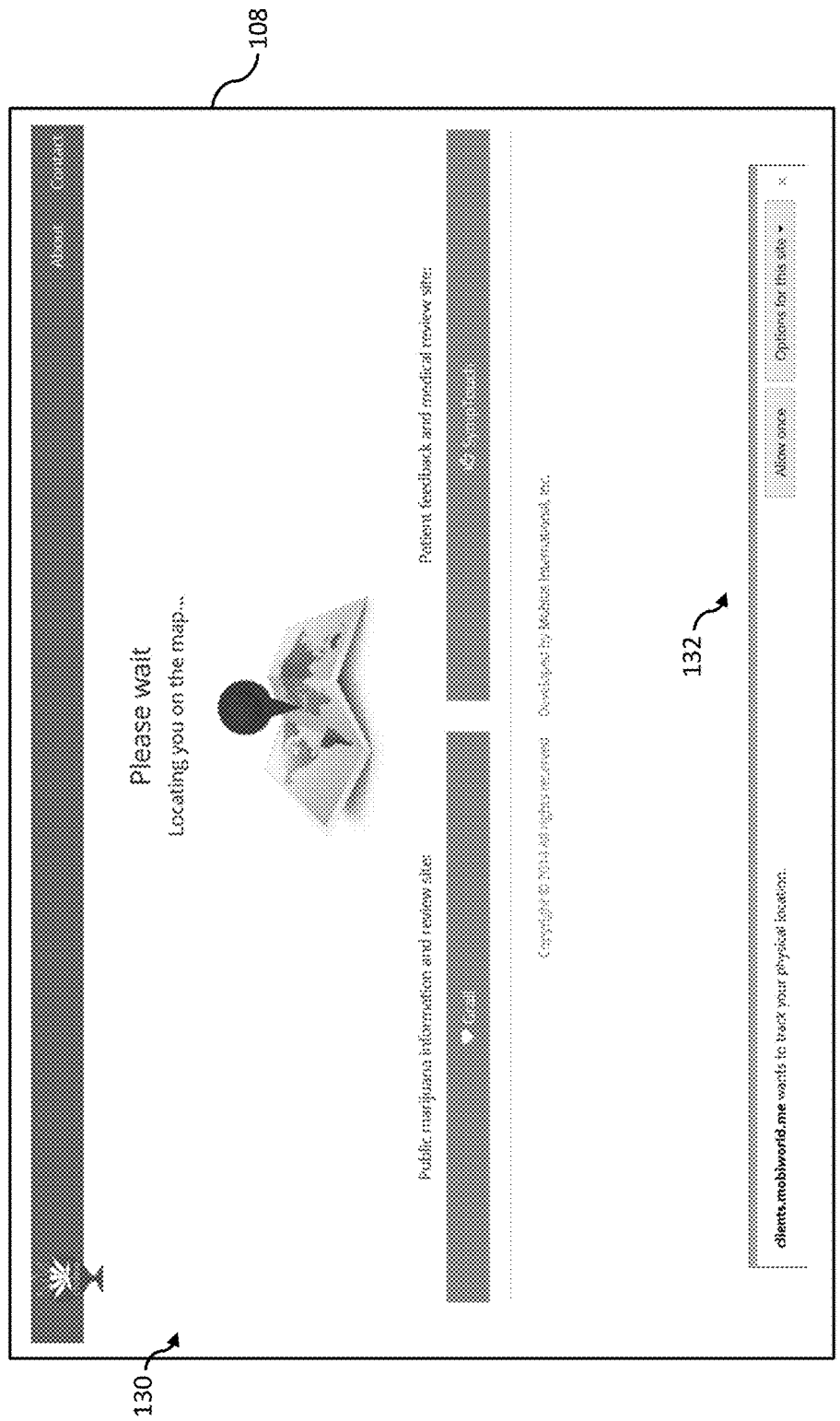
FIG. 5 schematically depicts a user interface according to one or more embodiments shown and described herein.

Referring collectively to FIGS. 1 and 3, the code 22 can be provided to the tracking server 200, e.g., the code 22 can be transmitted over the internet 12. The tracking server 200 can be configured to transform the code 22 provided by the analyzer apparatus 30 into a core code 208. In some embodiments, the one or more processors 202 can automatically execute a code generation module 210 configured to digitally encrypt the code 22 into core code 208. For example, the code generation module 210 can comprise a cryptographic hash function, i.e., any function configured to map the code 22 into a data set that is difficult to map back to the code 22 without the function and the code 22. In some embodiments, the code 22 can be encrypted by assigning values to polymorphic markers. Because the core code 208 is unique, the core code 208 can serve as a data record identifier provided in memory 204 for an associated one of the controlled items 20, e.g., a strain of cannabis. Accordingly, any genetic profile identified in the code 22 can be used indirectly via the core code 208 as a tool for identity assurance from species down to the level of an individual organism without revealing the genetic profile.

In some embodiments, after the core code 208 is generated, the core code 208 can be held digitally strictly within memory 204, i.e., core code 208 can be stored without being provided in print. The core code 208 can be associated with one or more additional instances of data such that the instances of data are linked in a manner that allows for the retrieval of each of the instances from information provided by one of the instances. Accordingly, each instances of the data can be identified as being related to the core code 208. For example, the core code 208 can be provided in a relational manner such as, for example, spreadsheet data, database data, or any format suitable to organize the data for use with a relational system. Optionally, memory 204 can have a first memory partition 212 and a second memory partition 214 that are segregated from one another. The core code 208 can be stored in the first memory partition 212 and can be accessible to a client device 100. Thus, along with each core code 208, information (i.e., data) may be stored and located (e.g., via querying for any data associated with the core code 208) in the first memory partition 214. The code 22 can be stored in the second memory partition 214, which is not accessible by a client device 100. Since the code 22 is inaccessible to the client device 100, the memory segregation can increase the security of data stored on memory 204. Moreover, the tracking server 200 can use the code generation module 210 to link the code 22 to the core code 208, if necessary. Accordingly, data security can be improved to limit counterfeiting, while not significantly impacting the operation of the tracking server 200.

The tracking server 200 can be configured to generate or track label codes 216. The label codes 216 can be provided on memory 204. For example, the label codes 216 can be provided on the first memory partition 212 of memory 204. In some embodiments, the one or more processors 202 can automatically execute a label code module 218 to generate the label codes 216. The label codes 216 can be covert and randomly serialized in order to prevent sequential duplication or product counterfeiting. Each label code 216 can be encoded for a reclusive cyclic redundancy check.

Referring again to FIG. 1, the system 10 can include a plurality of labels 220 configured to provide a tangible identifier to associate the controlled items 20 with data of the tracking server 20. Each of the plurality of labels 220 can include an identification portion 222 indicative of one of the label codes 216. In some embodiments, the identification portion 222 can be encoded with a label code 216 in a human identifiable format. For example, at least a portion of the label code 216 can be printed in alphanumeric characters in the identification portion 222. Alternatively or additionally, the identification portion 222 can include an image that is encoded with at least a portion of the label code 216. For example, the image can include information that is outside of the visible range of the optical spectrum such as, for example, spectral images in infrared and ultraviolet wavelength ranges that cannot be visually perceived. Suitable labels 220 tag useable for the inclusion of such a label code 216, and which process step can customized to incorporate such a code is disclosed by U.S. Pat. No. 8,335,491, the disclosure of which is fully incorporated herein by references. In some embodiments, each label code 216 can directly correspond to one and only one of the plurality of labels 220. In this manner, the label code 216 is unique and can be difficult to counterfeit.

Referring collectively to FIGS. 1, 2, 3, 4, and 5, the one or more processors 202 of the tracking server 200 can execute machine readable instructions to automatically perform a method 300 for tracking controlled items 20. The method 300 can include a process 302 for authorizing access to the tracking server 200. In some embodiments, the one or more processors 202 can automatically execute an authentication module 224 to selectively authorize access to functions according to account information 226. The account information 226 can be provided on memory 204 such as, for example, on the first memory partition 212. The account information 226 can include user log-in credentials such as, for example, username, password, authorization code, entity type, or combinations thereof.

In some embodiments, a user interface can be provided upon the display 108 of the client device 100. The access input can be received by the client device and transmitted to the tracking server 200. The tracking server 200 can validate the access input to the account information 226 to provide selective access to features. In some embodiments, the client device 100 can automatically detect location data of the client device 100 and provide the detected location data as part of the access input. For example, the client device 100 can use the GPS receiver 114 to determine the detected location data. The tracking server 200 can provide a user interface 130 upon the display 108 of the client device 100.

The user interface 130 can provide objects indicating that the user's geo-reference location (geo-tagging) is being located. The user interface 130 can have an approval control 132 configured to allow the user to provide input to selectively determine whether to transmit the detected location data. The authentication module 224 can compare the detected location data to the location information associated with the user log-in credentials to validate the access input. If the detected location data and the location information associated with the user log-in credentials indicated are the same or about the same, i.e., within a predetermined range (e.g., about 10 meters). The use of detected location data can mitigate unauthorized access using guessed or absconded user log-in credentials.

According to the embodiments described herein, the account information 226 can include biometric data associated with the user log-in credentials such as, but not limited to, one or more fingerprints. The client device 100 can collect biometric input with the biometric sensor 118 and automatically provide the biometric input as part of the access input. The authentication module 224 can compare the biometric input to the biometric data associated with the user log-in credentials to validate the access input. If the biometric input does not match the biometric data associated with the user log-in credentials, access to the non-public features of the system 10 can be refused. If the authentication module 224 validates a user as an administrator, the method 300 can proceed to process 304.

Referring collectively to FIGS. 1, 3, 4, 6, and 7, at process 304, an administration portal 134 can be provided upon the display 108 of the client device. Access to data stored on the memory 204 can be provided through the administration portal 134. The administration portal 134 can include a live map control 136. Upon receiving input with the live map control 136, a map object 138 can be provided upon the display 108 of the client device 100. The map object 138 can be encoded to provide location information associated with particular entity types (e.g., labs, growers, dispensaries, etc.) of the to the account information 226. For example, the map object 138 can correspond to a locality (e.g., a state) and entity objects 140 corresponding to the entity types can be positioned upon the locality in accordance with the location information. Each of the entity objects 140 can be encoded according to entity type with labels (labs (L), growers (G), and dispensaries (D)) and color code. The map object 138 can include an inventory summary object 142. The inventory summary object 142 can be configured to provide, based on the combined amounts at each facility associated with total inventory data 229, the total amount of the controlled items 20 held by each type of facility as well as an indication of the amount of the controlled items 20 in transit between facilities based upon grow data 228. Optionally, hovering over or selecting any the entity objects 140 can provide a summary of the inventory of the corresponding entity object 140 such as, for example, quantity of controlled items 20 on hand, in transit to, and in transit from the entity.

Referring collectively to FIGS. 1, 3, 6, 8, and 9, the administration portal 134 can include a labels control 144. Upon receiving input with the labels control 144, a label information object 146 can be provided upon the display 108 of the client device 100. The label information object 146 can be configured to provide a summary of the data associated with the labels codes 216 and tools for accessing the data associated with the labels codes 216. For example, each instance of the label codes 216 can be listed upon the label information object 146. Each of the label codes 216 can be associated with a status object 148 configured to indicate if the label code 216 is in use or unused, i.e., whether the label code 216 is currently being used in the system 10 to track, validate, and secure the controlled items 20. Each of the label codes 216 can be associated with a details object 150. In response to input received by the details object 150, a label detail object 152 that displays data associated with the corresponding label code 216. The data can include date and time when the label code 216 was associated with a core code 102, the entity associated with the label code 216, location information of the entity, the name of the controlled item 20 (e.g., strain), or any other associated data. The administration portal 134 can include an add labels control 154. In response to input received by the add labels control 154, the label code module 218 can generate additional label codes 216. Additionally, the system 10 can generate or print additional labels 220 corresponding to the additional label codes 216.

Referring collectively to FIGS. 1, 3, 6, 10, 11 and 12, the administration portal 134 can include a locality statistics control 156. Upon receiving input with the locality statistics control 156, a locality status object 158 can be provided upon the display 108 of the client device 100. The locality status object 158 can be configured to provide statistics of particular localities (e.g., counties, cities, etc.). For example, the locality status object 158 can include a plurality of locality objects 160 configured to display revenue information associated with the locality. The revenue information can include revenue by month, number of sales, and number of medical patients per county, or the like. In response to hovering over one of the locality objects 160, a revenue detail control 162 can be provided. Upon receiving input with the revenue detail control 162, a graphical object 164 can be provided that displays tax revenue data per month for the past 12 months associated with the selected locality.

Figure 6:
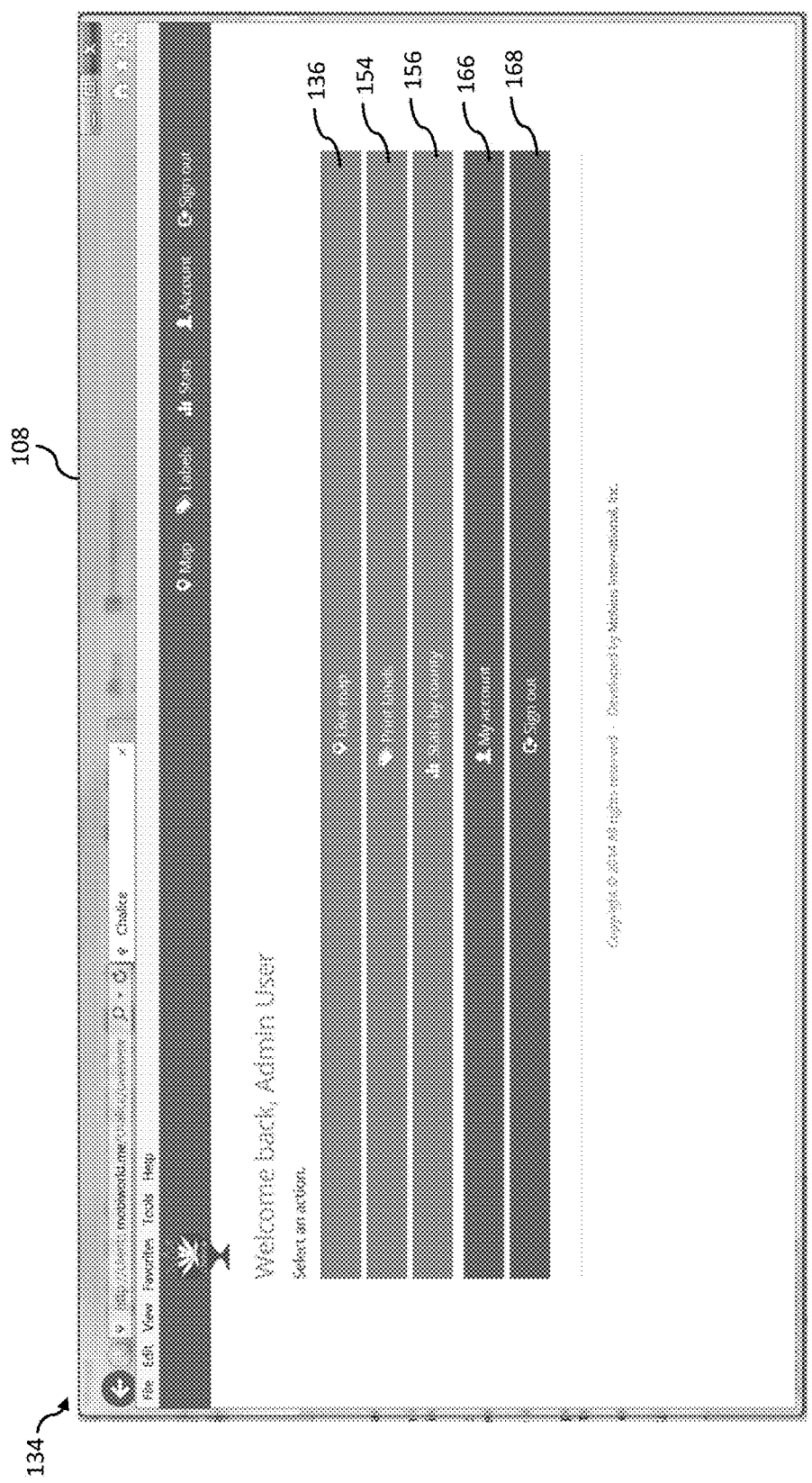
Figure 7:
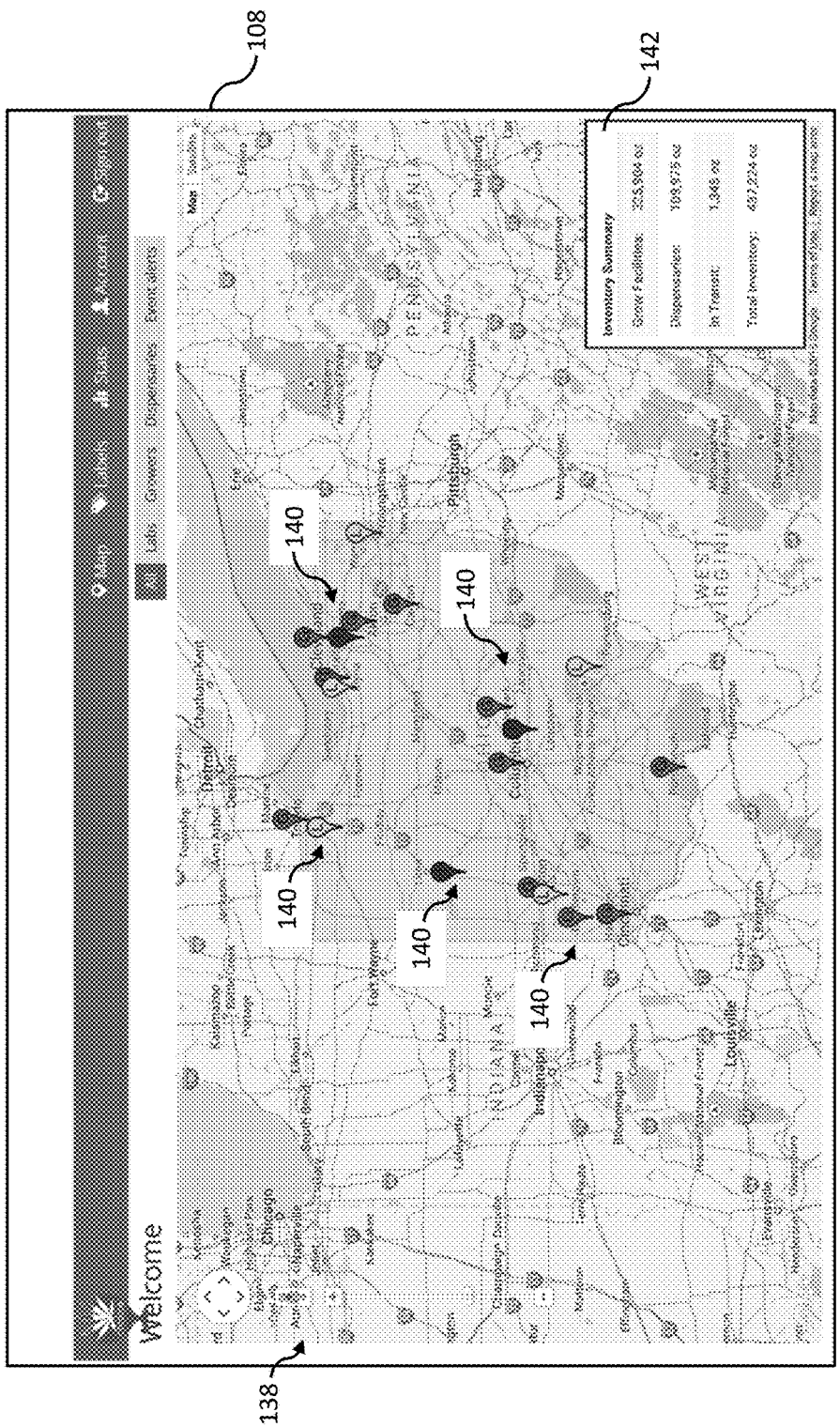
Figure 8:
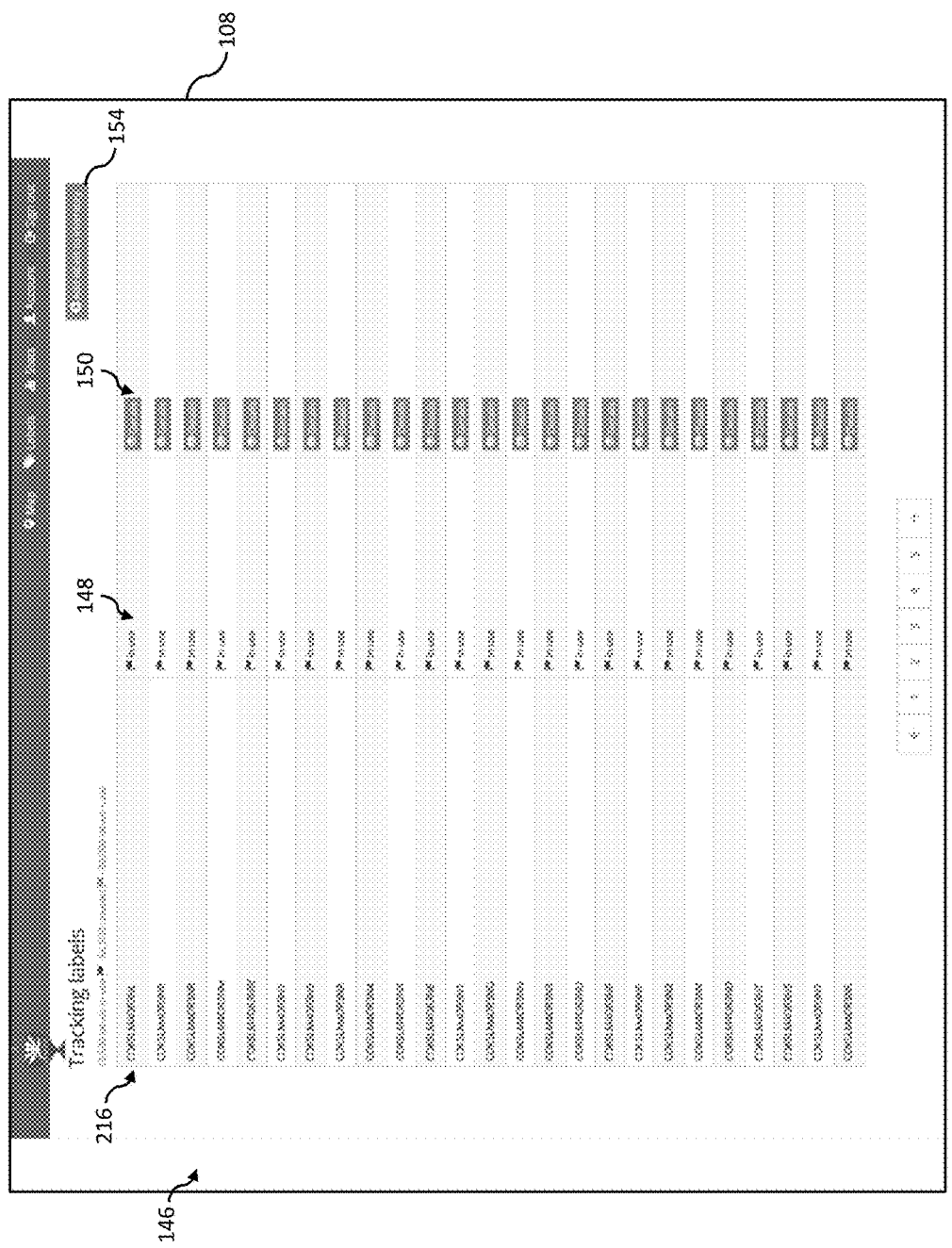
Figure 9:
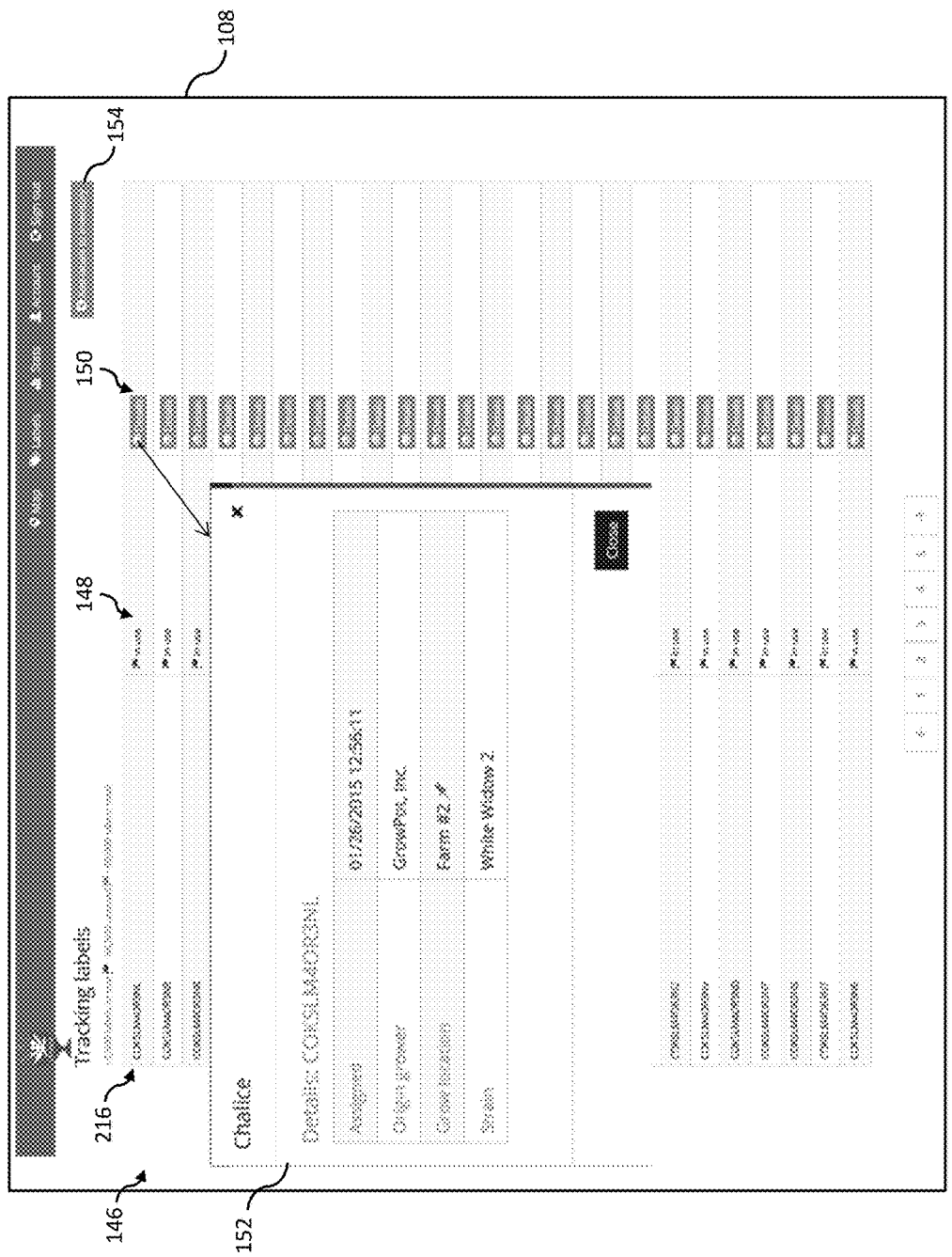
Figure 11:
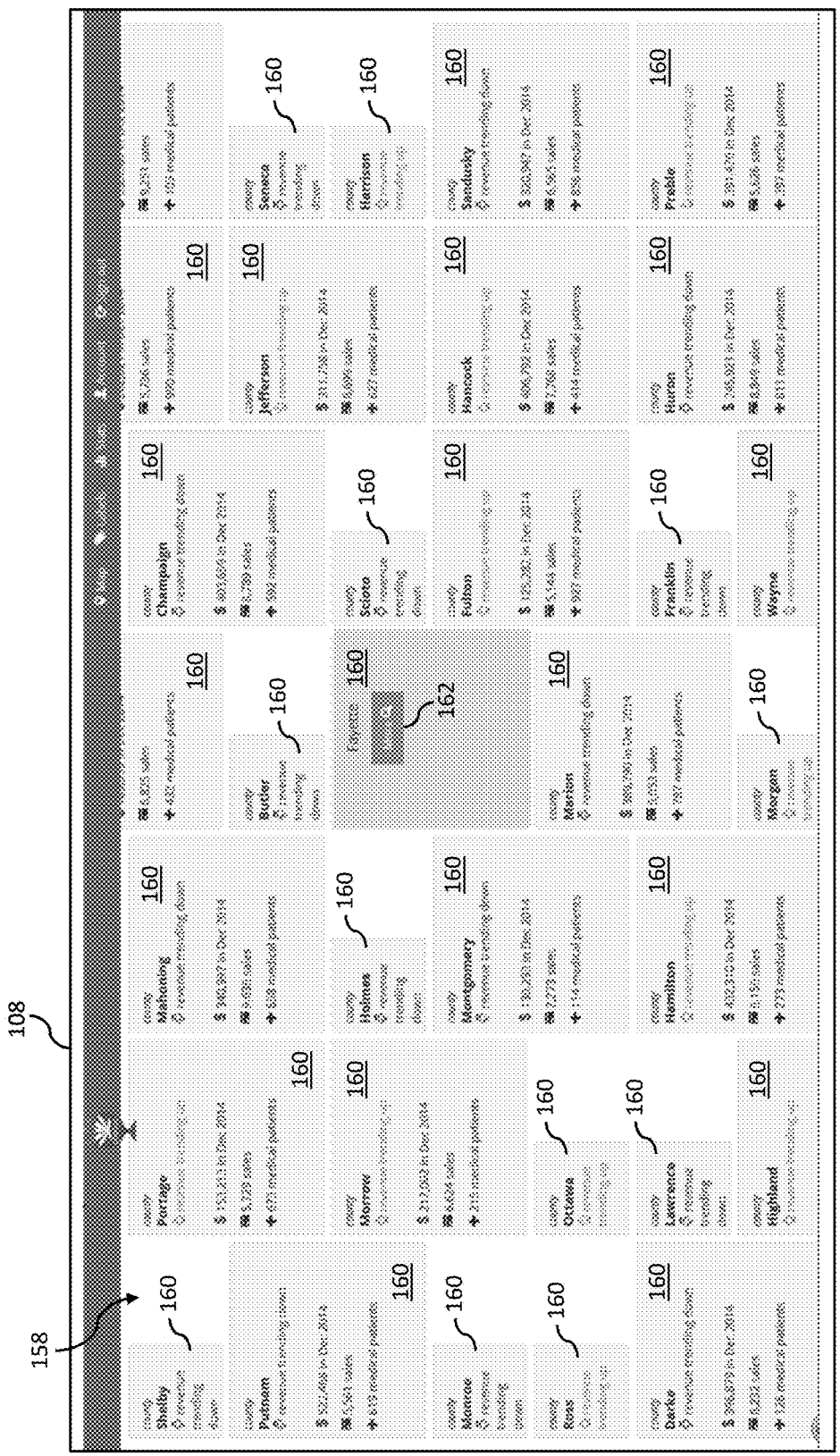
Figure 12:
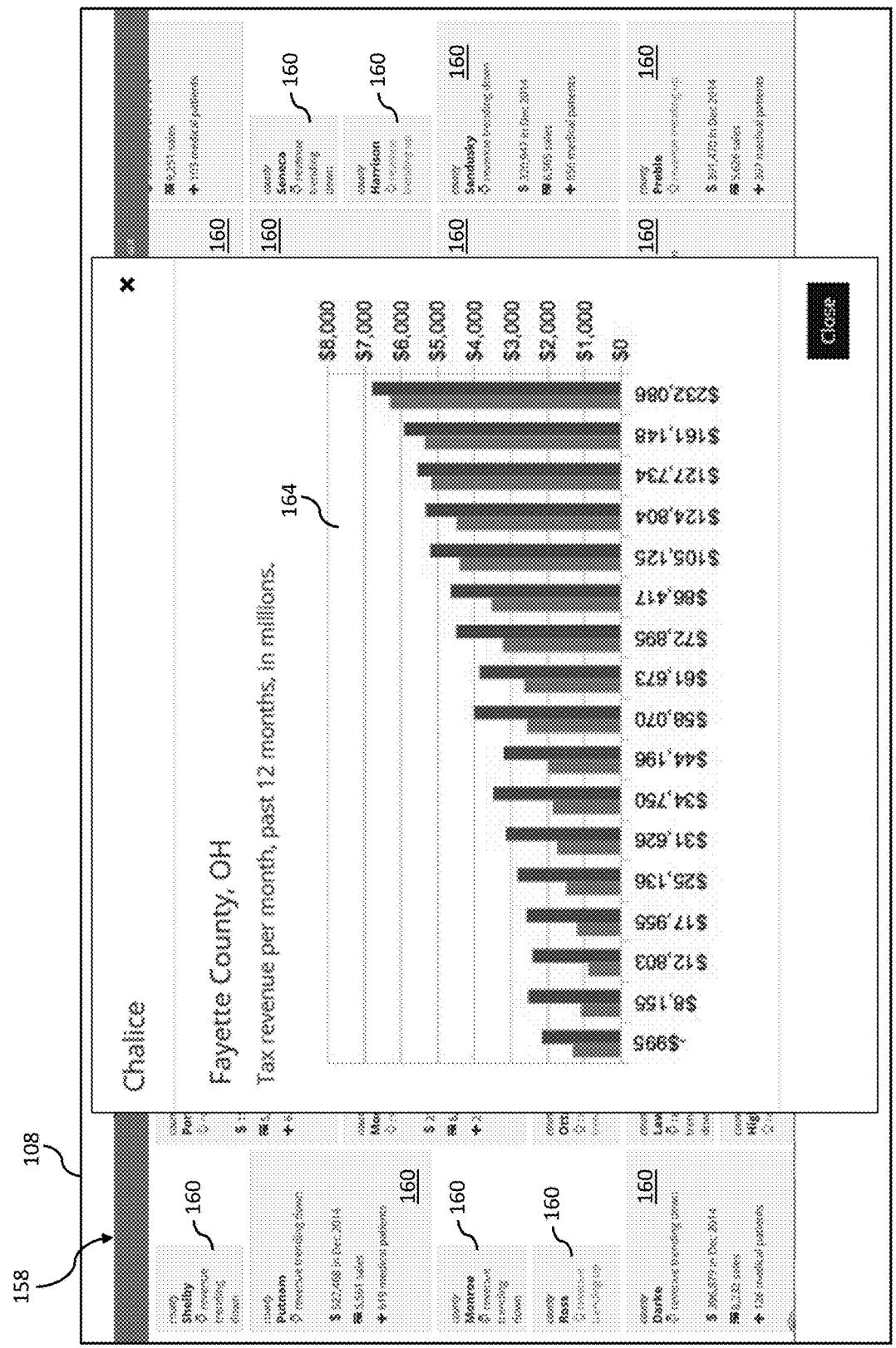
Figure 13:
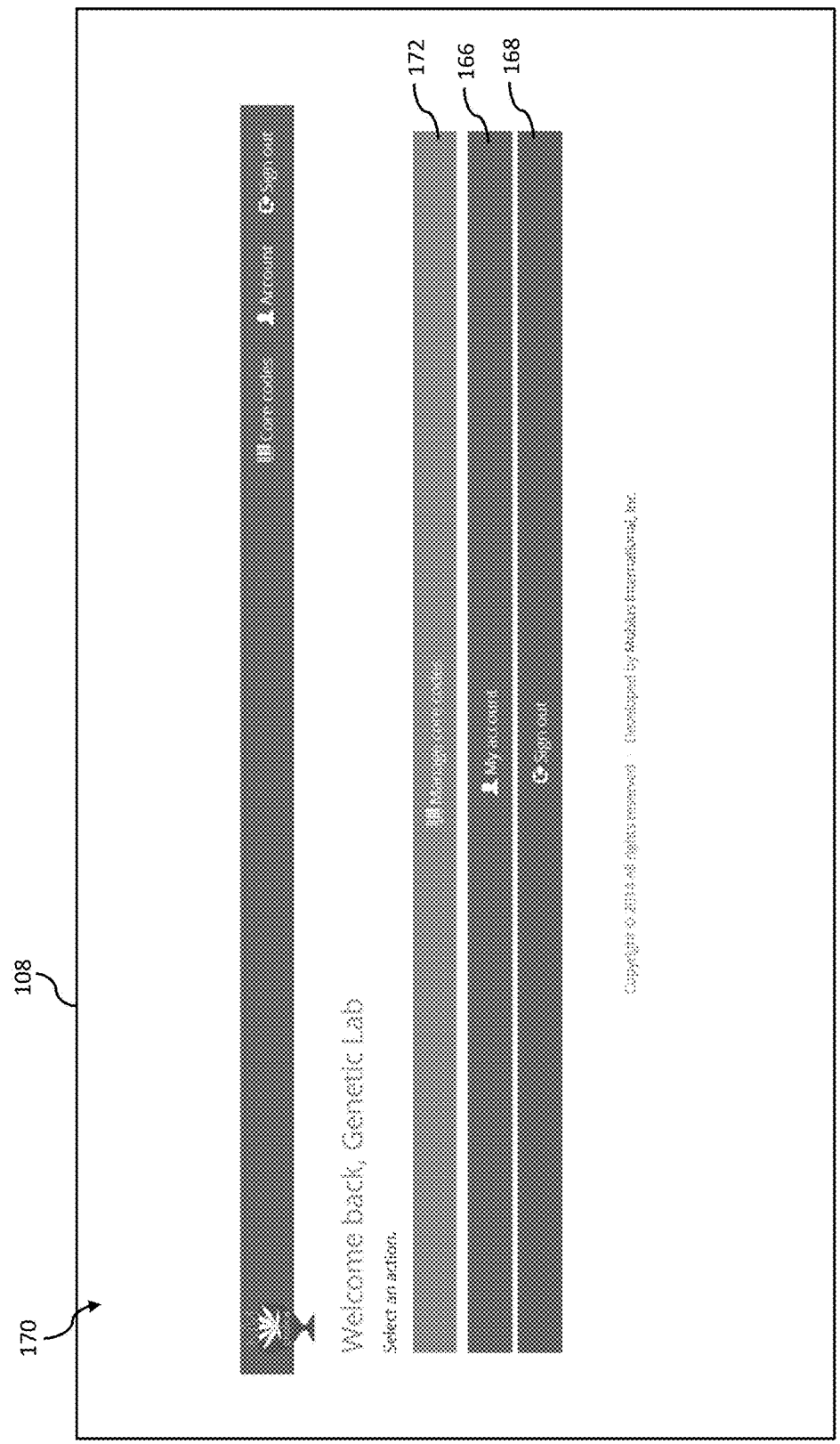
FIGS. 13-22 schematically depict user interfaces for accessing grower portal functions according to one or more embodiments shown and described herein.
Figure 14:
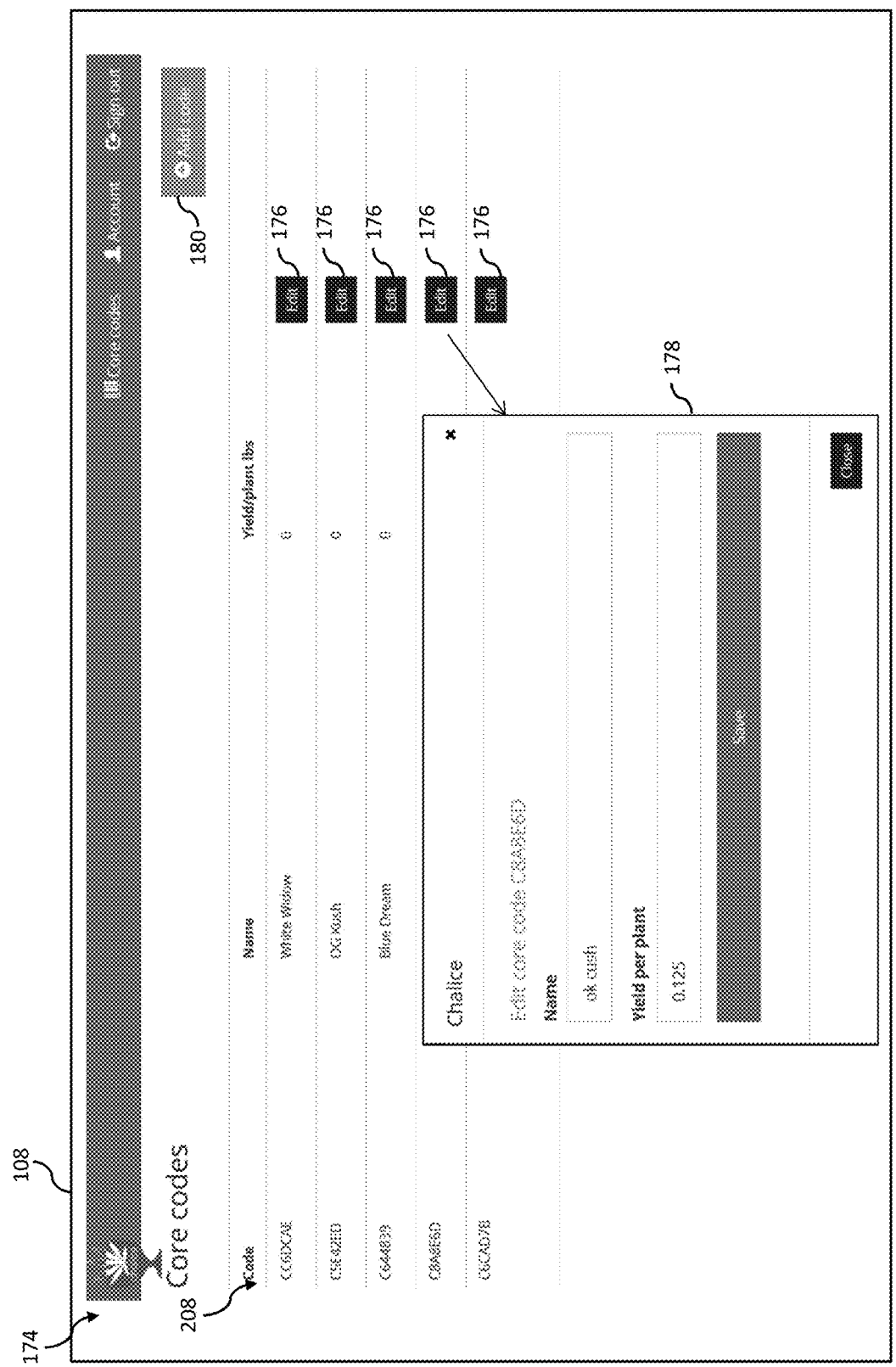
Figure 15:
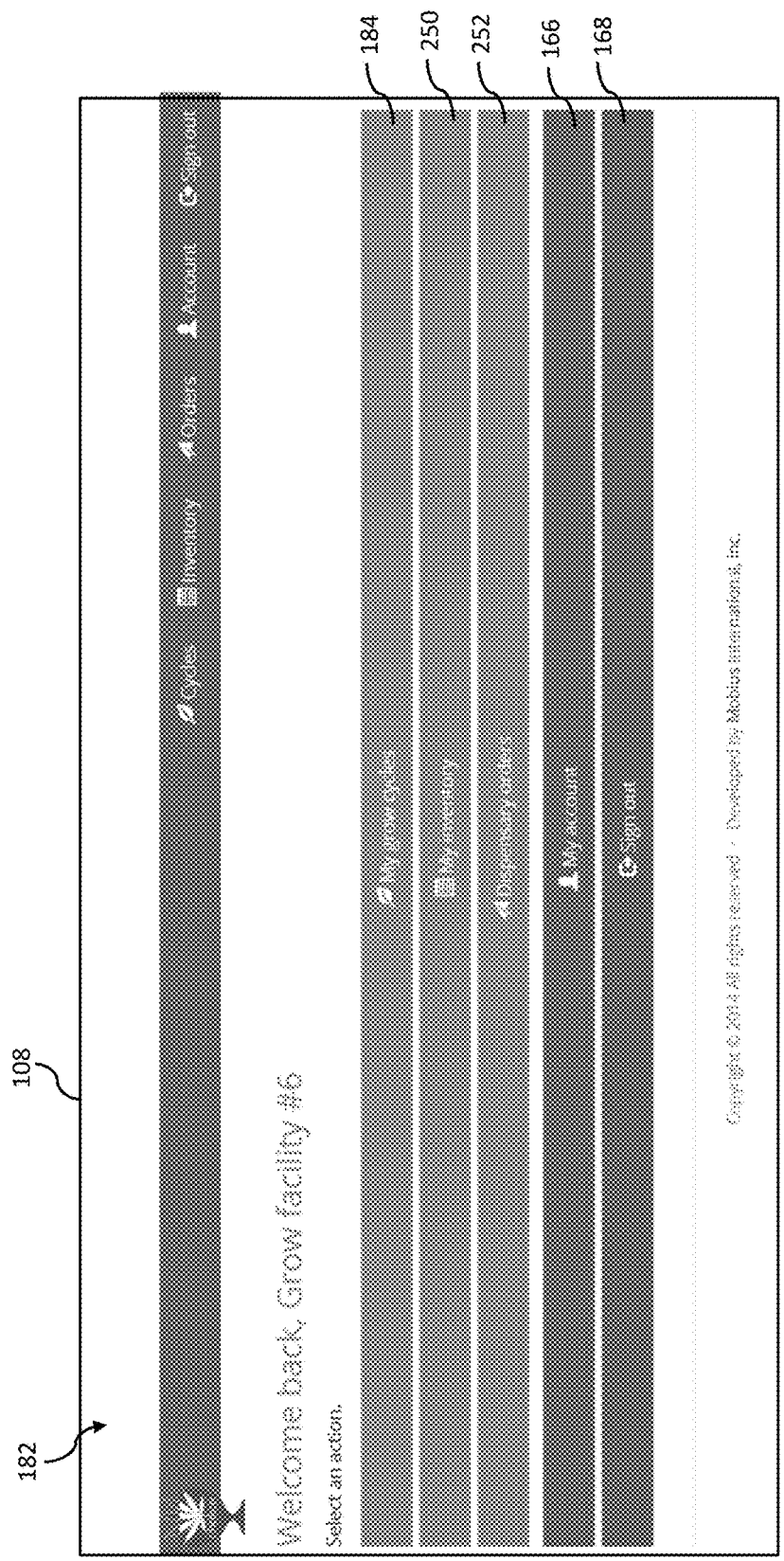
Figure 16:
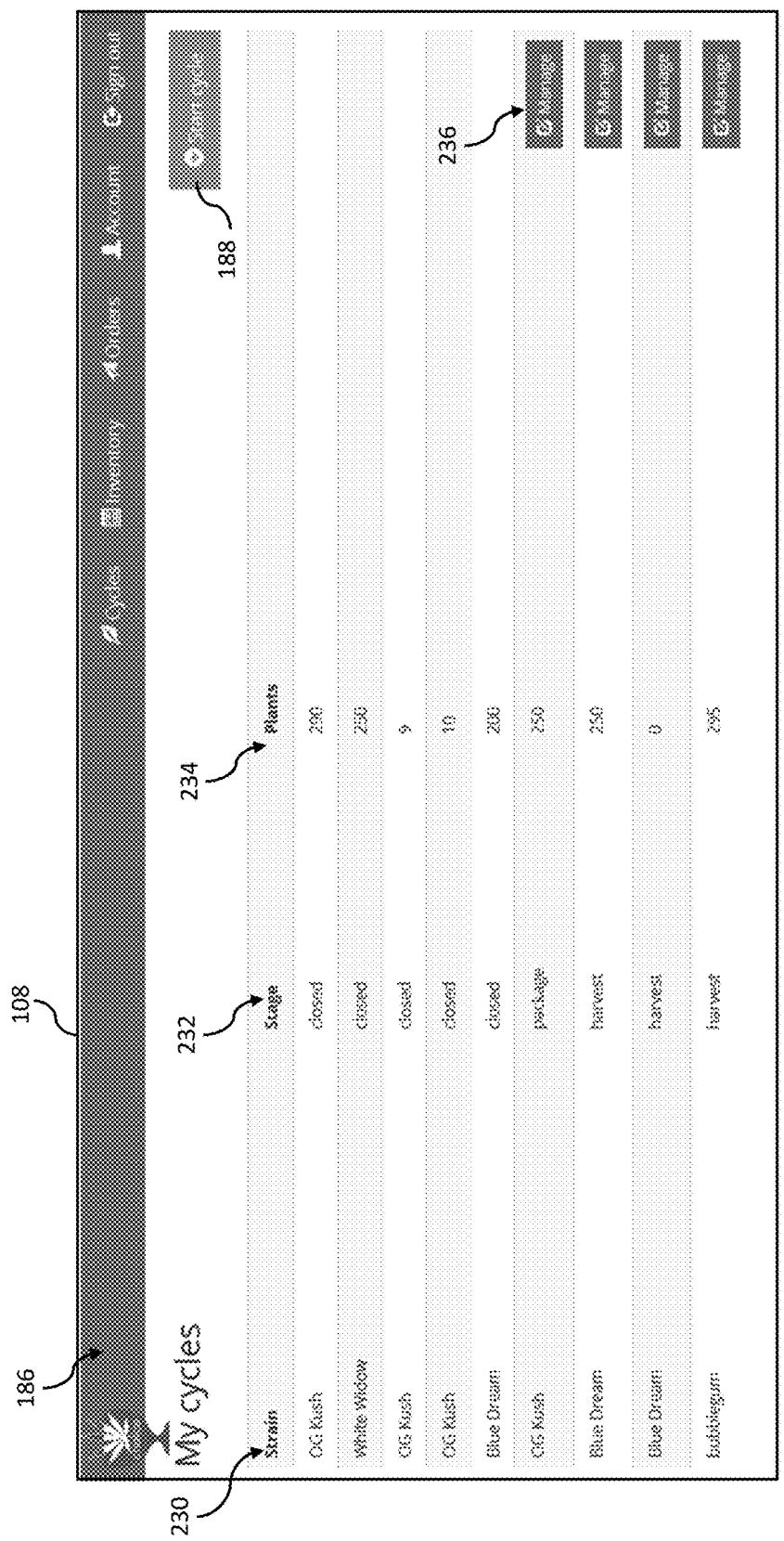
Figure 17:
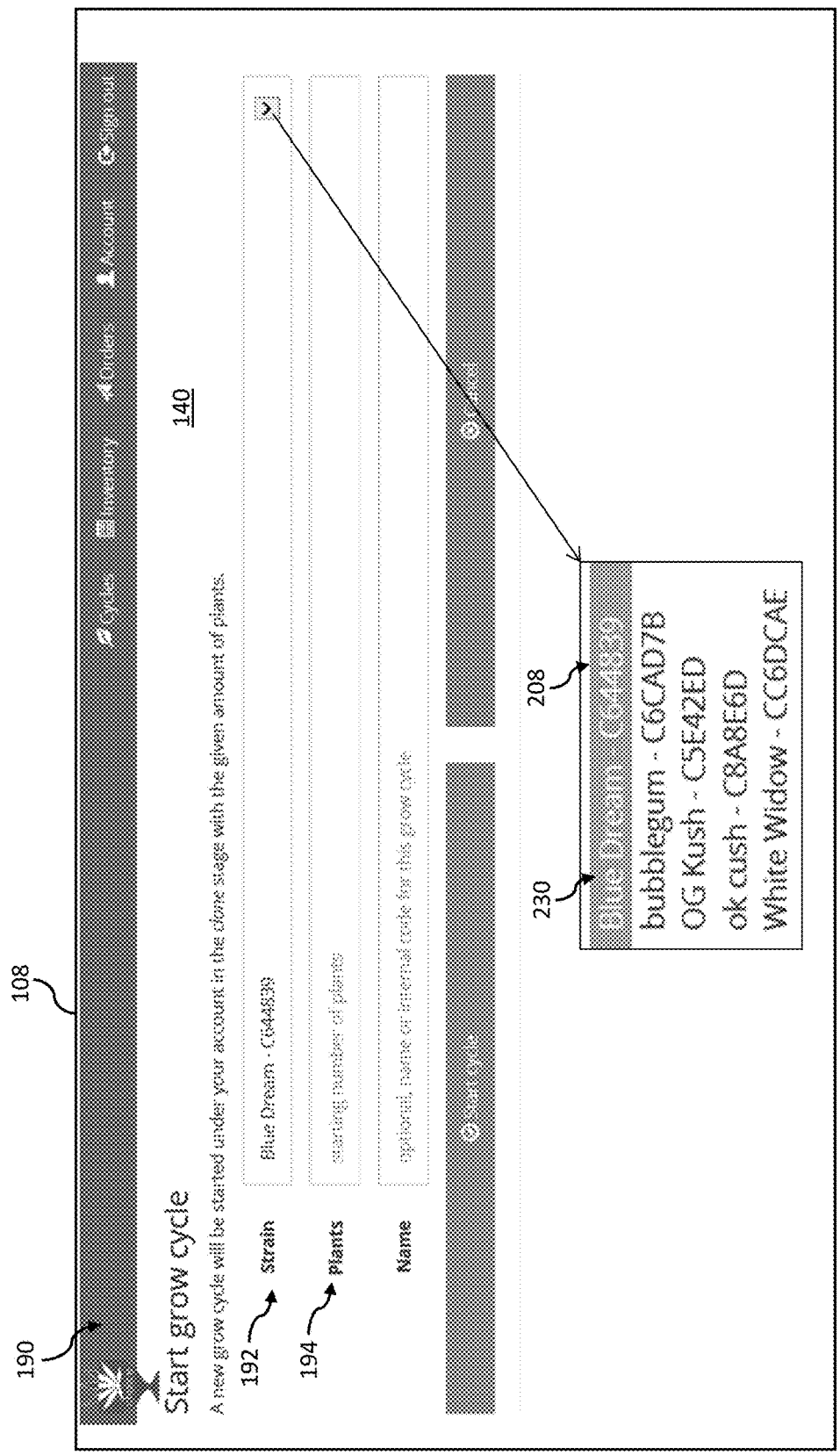
Figure 18:
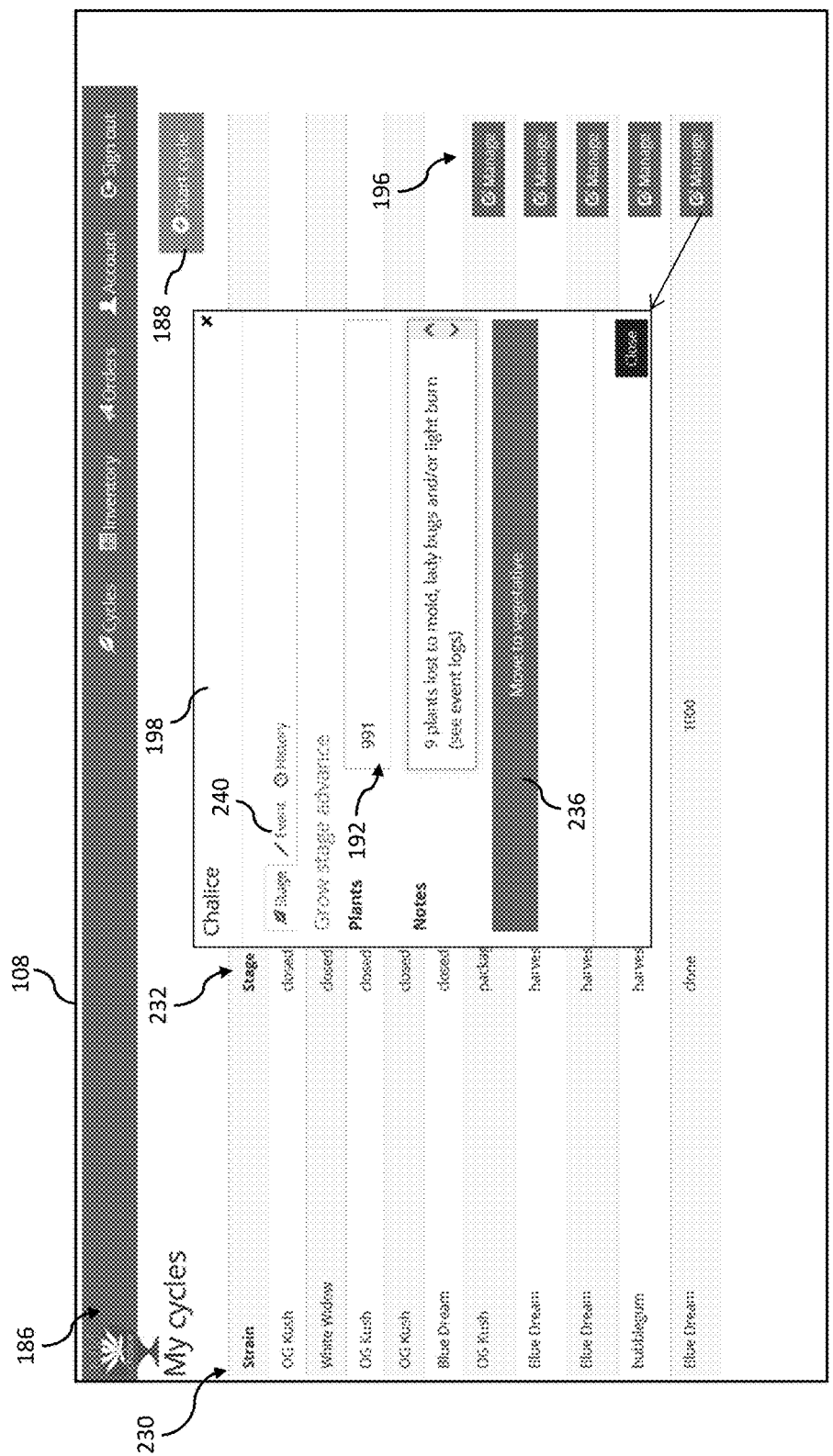
Figure 20:
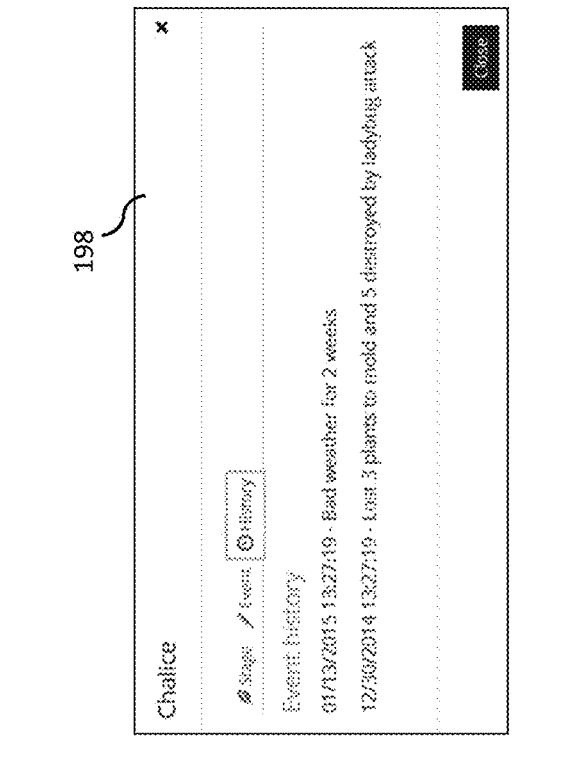
Figure 19:
Figure 21:
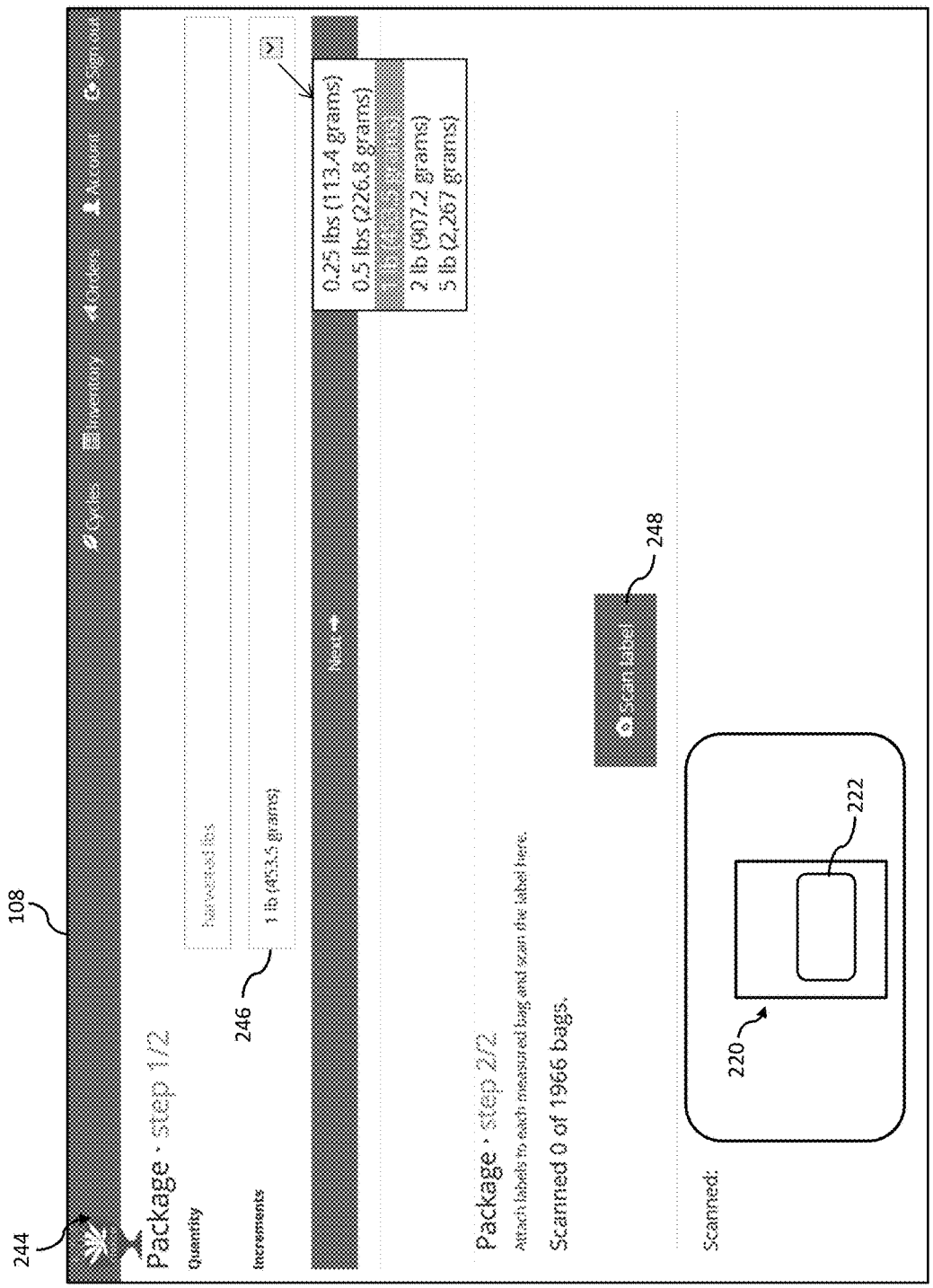
Figure 22:
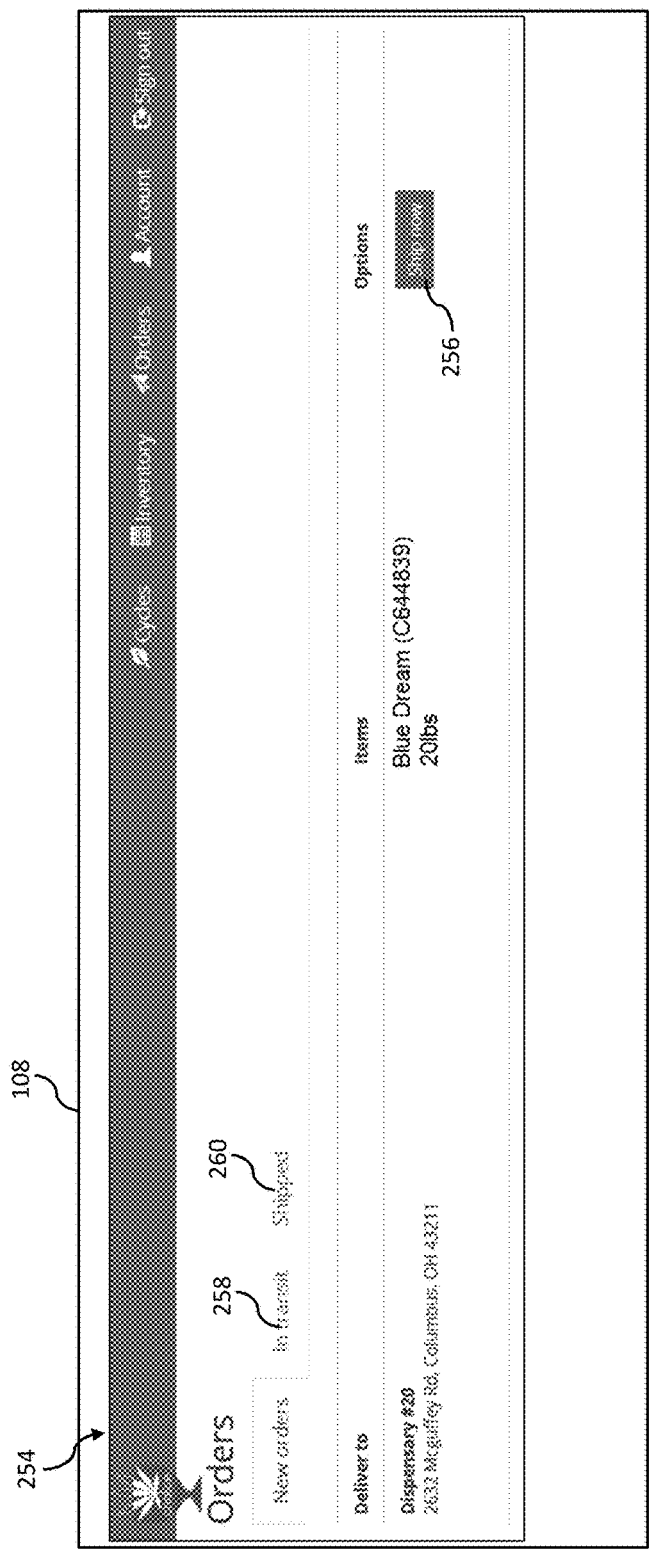
Figure 23:
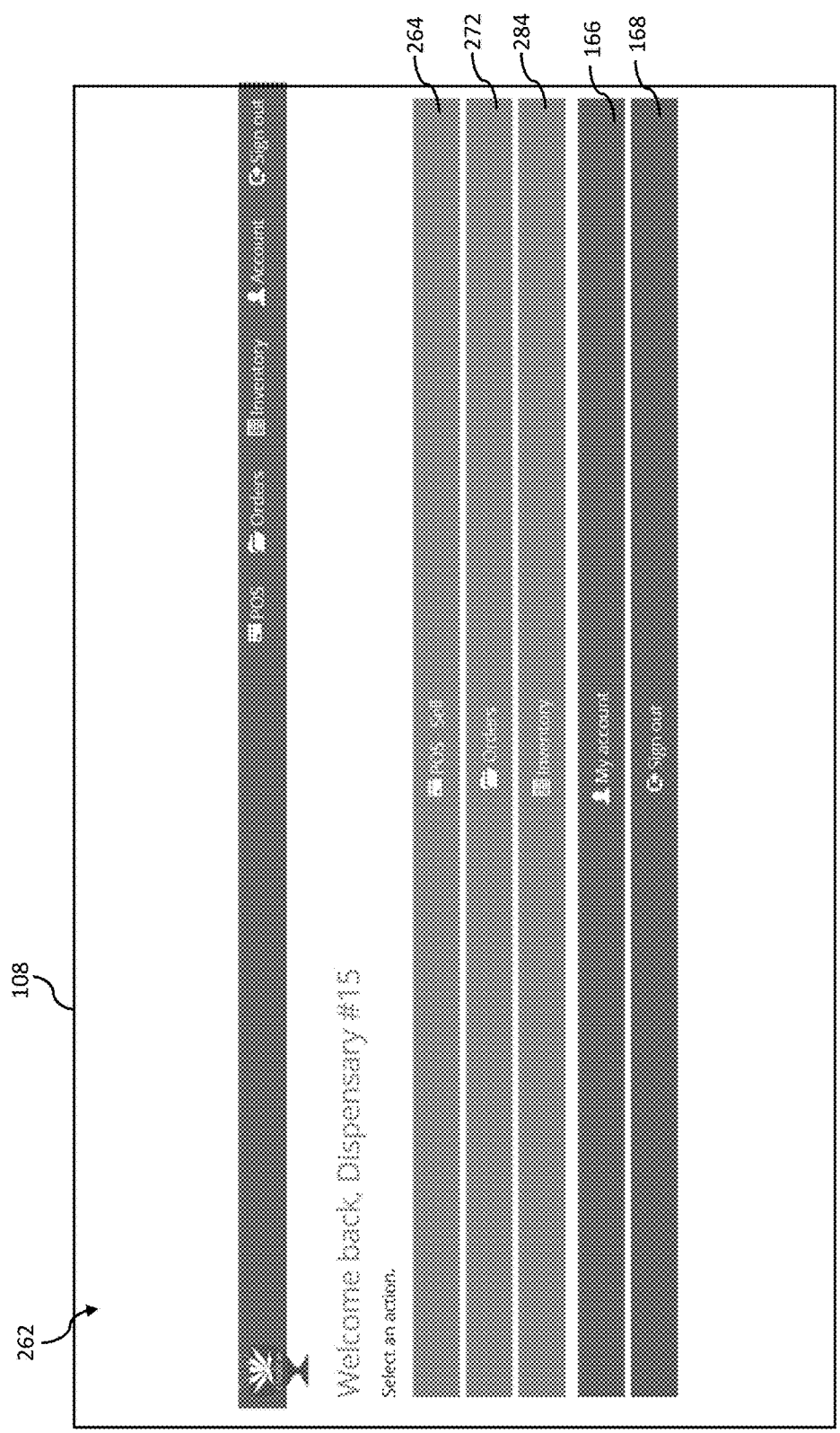
FIGS. 23-25 schematically depict user interfaces for accessing grower portal functions according to one or more embodiments shown and described herein.
Figure 24:
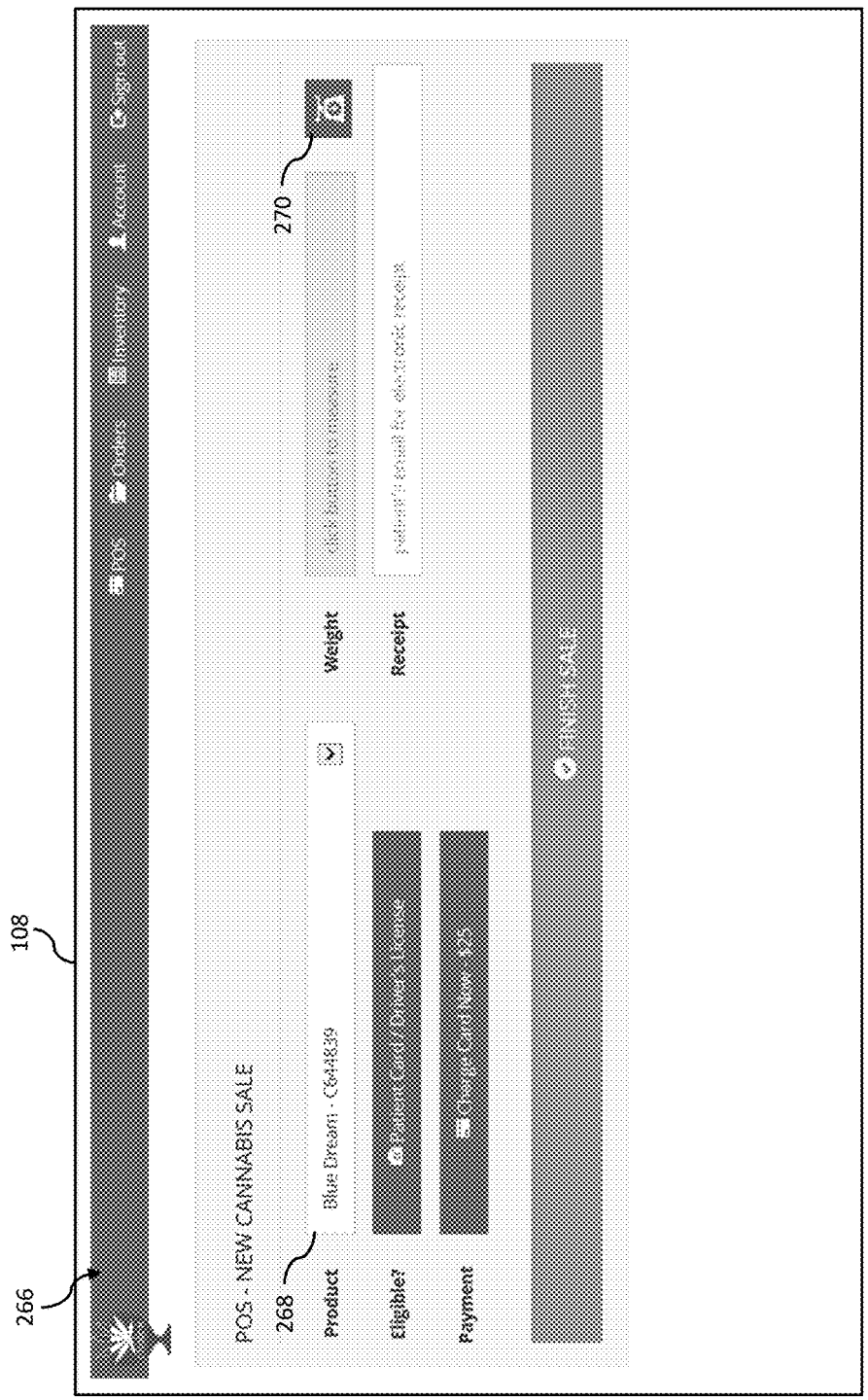
Figure 25:
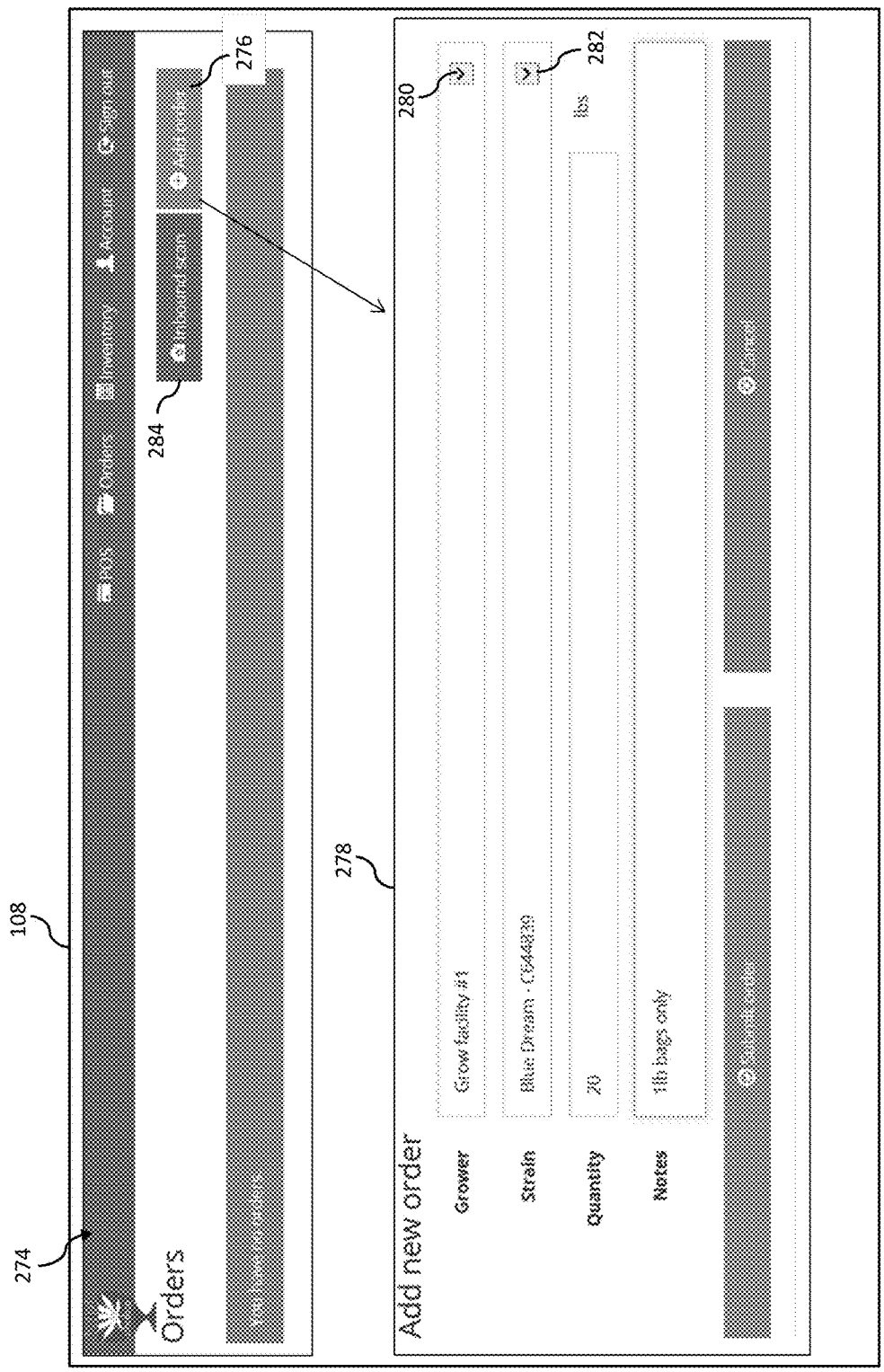
Figure 26:
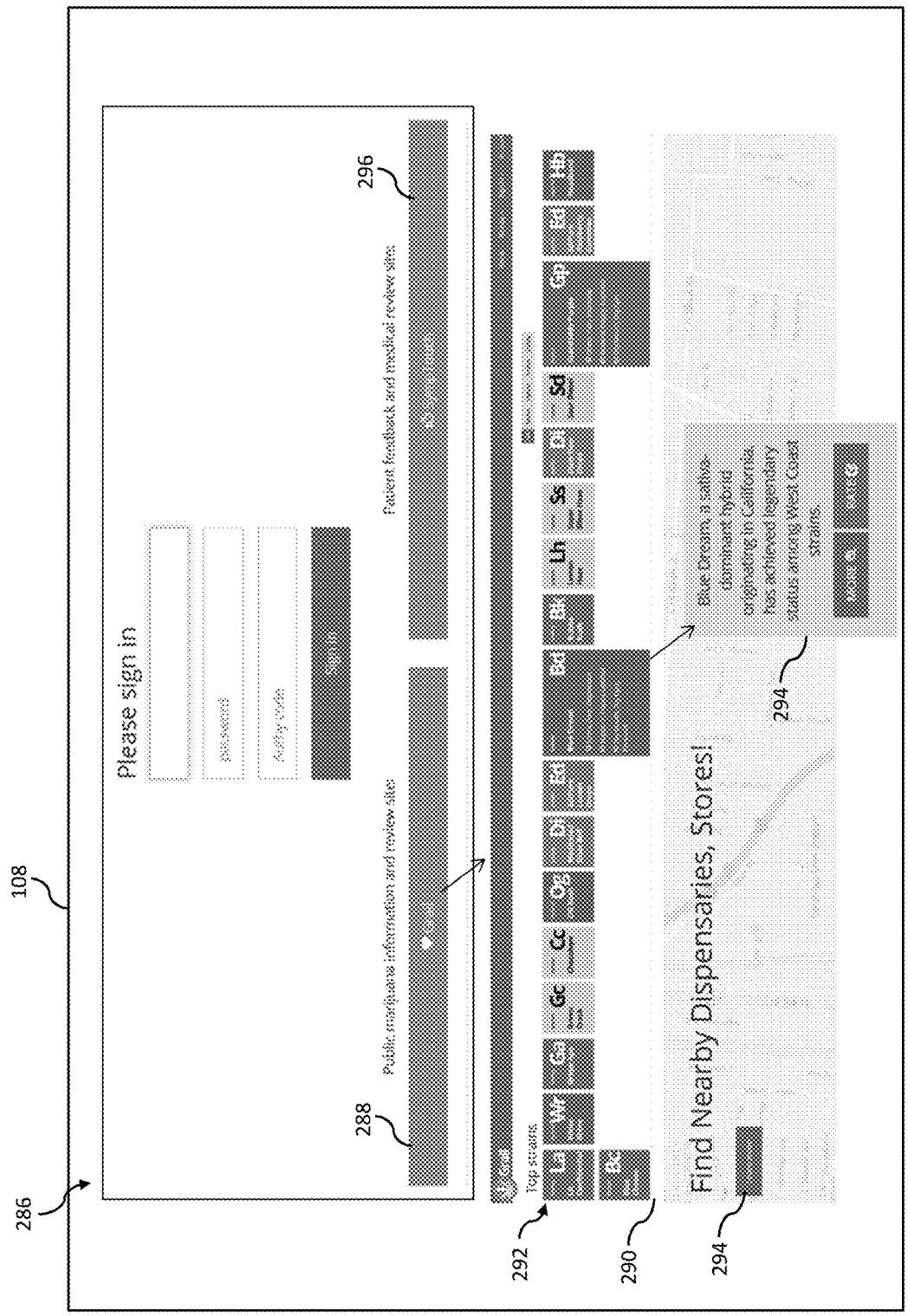
FIG. 26 schematically depicts a user interface for accessing public portal functions according to one or more embodiments shown and described herein.

Referring collectively to FIGS. 3 and 6, the administration portal 134 can include an account control 166 that can be selected to provide input to alter the account information 226 associated with the log-in credentials. The administration portal 134 can include a sign out control 168 that can receive input to exit the administration portal 134.

Referring collectively to FIGS. 1, 3, 4, 13, and 14, at process 302, if the authentication module 224 validates a user as a lab, the method 300 can proceed to process 306. At process 306, a lab portal 170 can be provided upon the display 108 of the client device 100. The lab portal 170 can include a core code control 172, the account control 166, and the sign out control 168. Upon receiving input with the core code control 172, a lab editor object 174 can be provided upon the display 108 of the client device 100. The core codes 208 associated with the lab (e.g., generated from a code provided by the lab) can be provided in a list with a controlled item name and specific information, like expected plant yield in pounds per plant. Each of the core codes 208 can be associated with a edit control 176. Upon receiving input with the edit control 176, a core detail control 180 can be provided. The core detail control 178 can provide input fields for receiving input to add or change information associated with the corresponding core code 208. The lab portal 170 can include a new code control 180 configured to receive a code 22 from the lab and generate a new core code 208 using the code generation module 210.

Referring collectively to FIGS. 1, 3, 4, and 15, at process 302, if the authentication module 224 validates a user as a grower, the method 300 can proceed to process 308. At process 308, a grower portal 182 can be provided upon the display 108 of the client device 100. The grower portal 182 can include a grow cycle control 184, the account control 166, and the sign out control 168. Upon receiving input with the grow cycle control 184, a cycle management object 186 can be provided upon the display 108 of the client device 100. The cycle management object 186 can be configured to receive input for associating grow data 228 with the core codes 208. Generally, the core codes 208 are prepopulated within the system 10. For example, the grower associated with the log-in credentials can send to the lab a genetic sample, such as a cannabis plant fan leaf, to be analyzed by the analyzer apparatus 30 for DNA sequence identification of the sample. The code 22 corresponding to the sequence identification of the sample can be provided to the code generation module 210, and the core code 208 can be generated and associated with the log-in credentials of the grower.

The cycle management object 186 can provide a summary of the grow data 228. The grow data 228 can include data that can be used to characterize the life cycle of the controlled item 20. For example, the grow data 228 can include strain data 230 indicative of the strain corresponding to the code 22 and the core code 208, phase data 232 indicative of a life cycle phase of the controlled items 20 associated with the core code 208, quantity data 234 indicative of an amount of the controlled items 20 associated with the core code 208.

Referring collectively to FIGS. 1, 2, 3, 16, and 17, the cycle management object 186 can include a start cycle control 188 for associating a new life cycle with the core code 208. Upon receiving input with the start cycle control 188, the client 100 can be configured to automatically prompt the user to take a capture an image of one of the labels 220 with the optical sensor 116. The label code 216 can be extracted automatically by the label code module 218 from the identification portion 222 of the image of the label 220, which is encoded with the label code 216. In some embodiments, the identification portion 222 can include a composite spectrogram generated by a spectrum analyzer to view both time and frequency domains simultaneously. The spectrogram can have one axis for the time domain, one axis for the frequency domain, and typically uses color to represent power levels. The composite spectrogram may be of the entire image, of a predetermined portion of the image, or a plurality of predetermined portions of the image. Thus, the strain of the controlled items 20 can be associated with the label code 216. For example, the imaged label 220 can be placed in physical proximity or attached to at least one of the controlled items 20 that are to be associated with the label code 216. It is common for growers to keep all genetically similar plants grouped together throughout their growth to avoid cross-contamination of the strains. Accordingly, the label code 216 can represents all the plants started at the same time with the genetic material corresponding to the core code 208, which can typically number about 500 to about 1000 plants.

Alternatively or additionally, upon receiving input with the start cycle control 188, a new cycle object 190 can be provided upon the display 108 of the client device 100. The new cycle object 190 can include a core selection control 192 for selecting one of the core codes 208. For example, the core selection control 192 can be provided as a drop down list populated with the strain data 230 and core codes 208 associated with the grower. As noted above, the strain data 230 and the core codes 208 can be derived from a sample of the controlled item 20. Thus, the strain data 230 and the core codes 208 can be generated prior to starting the life cycle in the system 10. The new cycle object 190 can include a quantity control 194 for providing quantity data of the controlled item 20 associated with the corresponding to the core code 208. For example, at the start of the growth cycle, the quantity information can describe the number of plants or clones of the strain. Accordingly, the grow data 228, the label code 216, and the core code 208 can be associated with one other in the system 10.

Referring collectively to FIGS. 1, 2, 3, 18, 19, and 20, the cycle management object 186 can include a manage cycle control 196 for updating the grow data 228 associated with the core code 208. Upon receiving input with the manage cycle control 196, a grow data management object 198 can be provided upon the display 108 of the client device 100. The grow data management object 198 can be configured to advance the life cycle of the controlled item 20 to a subsequent phase. For example, the life cycle of cannabis can include a clone growth phase (i.e., the initial phase), a vegetative phase, a flower phase, a harvest phase, and a package phase, which can be the phase where the harvested controlled items are packaged into individual packages. The controlled item 20 can be tracked according to the label code 216 and the core code 208, which can be imaged through each subsequent phase. For example, the grow data management object 198 can include the quantity control 194 for receiving subsequent quantity data indicative of a subsequent amount of the strain of the controlled item 20 and an advance phase control 236 for receiving subsequent phase data indicative of a subsequent life cycle phase of the strain of the controlled item 20. Upon receipt of the input, the grow data 228 can be automatically updated.

In some embodiments, the tracking server 200 can include a life cycle module 238 configured to automatically determine an acceptable amount of the strain of the controlled item 220. For example, the life cycle module 238 can be configured to predict the acceptable amount at each life cycle phase based upon the grow data 228 collected from previous phases. In some embodiments, the grow data 228 can include environmental data, such as electrical data (hours/wattage) of light provided, temperature, humidity, or the like. The environmental data can be provided by one or more environmental sensors 32 communicatively coupled to the tracking server 20. Alternatively or additionally, the environmental data provided by a public utility, manual data entry, or any other internet connected source. The life cycle module 238 can include predictive algorithms that anticipate a timeline of acceptable amounts based upon the strain of plant material being used and the grow data 228. For example, the predictive algorithms can track storage conditions, progress and/or predict expected losses and harvest yields based on the grow data 228. In some embodiments, equations can be automated to predict an expected harvest yield based on the wattage of light provided to a cannabis crop, e.g., 1 gram/watt*number of plants—expected harvest yield. Accordingly, the system 10 can monitor for any security issues, grow problems, missing inventory, etc.

Each plant has a reasonably definitive timeline based on each phase of growth, from cloning to vegetative to flower phase. For example, each strain can be correlated inherent time markers. A particular strain can have a known life cycle such as, for example, about 12 to about 16 weeks, with a defined pace for each growth phase. Should the quantity data for a phase fall outside the acceptable amount range for the phase, an alert can be issued and marked on the timeline. Generally, the number of plants should reduce as the plants move through phases as part of the selection process (only the best specimens move on). Should the number increase in any phase, an alert can be issued. In some embodiments, the alert can be communicated to the client device 100, if the subsequent quantity data is beyond the acceptable amount for that phase in the life cycle. Alternatively or additionally, the system 10 can record an explanation of the unacceptable quantity data, which can be used to clear the alert.

Moreover, the quantity data at the harvest phase and the package phase can be determined based upon previous phases. For example, plant count and weight can be correlated by the life cycle module 238. In some embodiments, a baseline can be measured for yield based on strain, number of plants, and grow methodology. Additionally, a plus or minus percentage can be assigned for each grower based upon previous yields. Should new phase results fall outside the range, an alert can be issued as well. At any time, through audits or alerts, inventory can be reconciled. Predictive logic and trend lines can be established for each facility, offering real time and future harvest data.

It is to be appreciated that during a phase of the life cycle of the strain, an event can occur that results in the loss of one or more plants, thereby reducing the quantity data. In some embodiments, the grow data management object 198 can include an event control 240 for adding event data to the grow data 228, e.g., events resulting in the loss of plants. In some embodiments, if the subsequent quantity data decreases, the event control 240 can be automatically provided. The event control 240 can associate event data that impacts the quantity data with contextual information such as, for example, a description of the event, a photograph of the event, or a video of the event. For example, a video can be made of the destruction of all plants that are not passing on to the next phase, showing a clipping of each stem, or the like. Pictures of damaged plants may also be recorded in the event record. Alternatively or additionally, the event data can be time stamped. In some embodiments, the grow data management object 198 can include an event history control 242 for displaying the event data associated with the core code 208.

Referring collectively to FIGS. 1, 2, 3, and 21, at the package phase, the total quantity of the controlled item 20 associated with the core code 208 can be divided into smaller quantities each associated with a different label code 216. For example, a packaging object 244 can be provided upon the display 108 of the client device 100. The packaging object 244 can include an package quantity control 246 for receiving input indicative of a packaged quantity of the controlled item 20 associated with the core code 208. For example, the client device 100 can receive input indicative of a weight of the controlled item packaged into an individual container. Accordingly, the packaged quantity data can be added to the grow data 228 and associated with the core code 208. The packaging object 244 can include a label capture control 248 for capturing an image of a label 220 and automatically associating the label code 216 encoded in the identification portion 222 of the label 220 with the packaged quantity data and the core code 208. For example, the label code module 218 can validate the label codes 216 to determine that the label code 216 is unused. Alternatively or additionally, the label code module 218 can perform a cyclic redundancy check on the label code 216 to ensure that the code is authentic.

Upon harvest of multiple, genetically similar plants, all material can be catalogued and weighed to, for example, comply with state requirements. In addition, it is to be appreciated that each label code 216 is a unique code. Thus, each package is associated with a unique label code 216, which can be associated with the core code 208, the account information 226, and the grow data 228. After validating, total inventory data 229 can be updated according to the packaged quantity of the controlled item 20 (e.g. cannabis) and the inventory summary object 142 (FIG. 7) can be updated. Additionally, the total inventory data 229 can be associated with the core code 208, the label code 216, the account information 226, and the grow data 228. Accordingly, the tracking server 200 can provide an administrator access the data associated with the label code 216. The label code 216 can follow the controlled item 20 through wholesale and retail transactions.

Moreover, the system 10 can be configured such that the functions of the packaging object 244 are only available at the location associated with the account information 226. For example, the labels 220 can only be associated with the core data 208 within the confines of the grow facility associated with the account information 226. Attempts to associate label code 216 with a core code 208 outside of the grow facility can automatically cause the system 10 to generate an alert to all designated personnel such as, for example, all administrators, law enforcement agents, government personal, or any other communication channels associated with the account information 226. Likewise, offending client devices 100, until the alert is cleared by an administrator.

Referring collectively to FIGS. 1, 3, 15, and 21, the grower portal 182 can include an inventory control 250. Upon receiving input with the inventory control 250, the tracking server 200 can provide a summary of the inventory of the controlled item 20 available in individual packages, i.e., controlled items 20 associated with label codes 216 applied to individual packages, which are associated with the total inventory data 229.

Referring collectively to FIGS. 1, 3, 15, and 22, the grower portal 182 can include an order control 252. Upon receiving input with the order control 252, an order management object 254 can be provided upon the display 108 of the client device 100. The order management object 254 can be configured to manage orders for a grower. The order management object 254 can list all orders made to a grower with the requesting dispensary, the controlled item 20 and quantity to be shipped. The order management object 254 can include a new order control 256. In some embodiments, the new order control can be selectively activated. For example, if sufficient inventory is available to fulfill the order, the new order control can be active. Responsive to receiving input with the new order control 256, the client device 100 can be configured to capture an image of the label 220 associated with a package of the controlled item 20. The grow data 228 can be updated based upon the packaged quantity information associated with the label code 216. In some embodiments, the grow data 228 can include order status data indicative of the order status of the package such as, for example, ordered, in inventory, in transit, or shipped. Accordingly, the order status data of the package can be updated from inventory to transit. Additionally, the system 10 can verify that the appropriate strain of the controlled item 20 is selected based upon the core code 208 associated with the label code 216. The order management object 254 can further include a transit control 258 configured to provide a listing of packages in transit, and a shopped control 260 configured to provide a listing of packages that have been received by the dispensary.

Referring collectively to FIGS. 1, 3, 4, 23, and 24, at process 302, if the authentication module 224 validates a user as a dispensary, the method 300 can proceed to process 310. At process 310, a dispensary portal 262 can be provided upon the display 108 of the client device 100. The dispensary portal 262 can include a point of sale (POS) control 264, the account control 166, and the sign out control 168. Upon receiving input with the POS control 264, a POS object 266 can be provided upon the display 108 of the client device 100. The POS object 266 can be configured to sell the controlled item 20 to a buyer and update the total inventory data 229. For example, the total inventory data 229 (e.g., weight) can be reduced according to the dispensed weight data.

The POS object 266 can include a product control 268 for receiving input indicative of a selection of a controlled substance 20. In some embodiments, the product control 268 can provide a drop down box listing all of the label codes 216 or the core codes 208 associated with the dispensary. Accordingly, the controlled item 20 can be selected based upon the label codes 216, the core codes 208, or both. Alternatively or additionally, the product control 268 can be configured to capture an image of the label 220 associated with the package holding the controlled item 20 such as, for example, a label 220 attached to a package holding cannabis. The image can be communicated to the tracking server 20 and automatically decoded to identify the label code 216, the core code 208, or both. The POS object 266 can include a weight control 270 for receiving dispensed weight data indicative of the amount of the controlled substance being sold. In some embodiments, the system 10 can comprise a scale 24 communicatively coupled to the client device 100. Upon receiving input with the POS control weight control 270, the client device 100 can cause the scale 24 to detect a weight. The weight detected by the scale 24 can be provided as the dispensed weight data. Alternatively or additionally, the dispensed weight can be received by the weight control 270 control as tactile input, scanned from a barcode, captured as an image, or the like. After the sale is complete, the amount of the total inventory data 229 can be reduced by the dispensed weight, i.e., a dispensed weight of the controlled substance 20 is no longer tracked by the system 10.

Referring collectively to FIGS. 1, 3, 4, 23, and 25, the dispensary portal 262 can include an order control 272. Upon receiving input with the order control 272, an order object 274 can be provided upon the display 108 of the client device 100. The order object 274 can be configured to track and order amounts of the controlled item 20 based upon the core code 208 from the total inventory available for purchase, i.e., associated with the total inventory data 229 and indicated as being in inventory by the order status data of the grow data 228. The order object 274 can list any pending orders associated with the dispensary, i.e., identified as ordered, or in transit in the order status data. The order object 274 can include an add order control 276 configured to provide an add order object 278 responsive to input received by the add order control 276. The add order object 278 can be configured to update the order status data of any controlled item 20 associated with the total inventory data 229. For example, the add order object 278 can be configured to receive input indicative of a selection of an ordered weight of any strain of the controlled item 20. The add order object 278 can include a grower selection control 280 and a strain selection control 282 that cooperate to receive input indicative of a selection of a strain of cannabis from a desired grower. For example, the grower selection control 280 can receive input indicative of the selection of a grower from the account information 226. If the grower is selected first, the strain selection control 282 can be populated with the strains available from the selected grower based upon the associated grow data 228 or the core code 208. The strain selection control 282 can receive input indicative of the selection of a strain of the controlled item 20. If the strain is selected first, the grower selection control 280 can be populated with the growers associated with the selected strain. Once the order is submitted, the order status data of the grow data 228 associated with the ordered amount of the strain can be updated to ordered.

The order object 274 can include an inbound control 284 configured to associate the packages of the controlled item 20 with the dispensary and update the grow data 228. Upon receiving input with the inbound control 284, an image of the label 220 of each of the packages of the controlled item can be imaged by the client device 100. The images of the labels 220 can be transmitted to the tracking server 200, and the label codes 216 can be automatically extracted by the label code module 218. Accordingly, the order status data of the grow data 228 associated with the label codes 216 can be updated to shipped. Additionally, the label codes 216 can be associated with the dispensary. Moreover, since each of the dispensaries can be associated with location data, georeference mismatches can be automatically detected and an alert can be issued.

The dispensary portal 262 can include an inventory control 284. Upon receiving input with the inventory control 284, a listing of controlled items 20 on hand can be provided. For example, individual strains and amounts (e.g., by weight) can be listed based upon the core codes 208 and total inventory data 229 associated with the dispensary. As provided herein, the entire life cycle of the controlled item 20 from growth through retail transaction is tracked according to label codes 216 associated with core codes 208. Thus, the embodiments described herein allow for real time data that includes real time inventory information of all facilities using the system 10 and real time expected tax revenue information based on the tracked plants growing, the update inventory information for harvested material, shipping products, packaged inventory on hand, and actual tax revenue based on the calculation of sales information from all purchases. Additionally, the real time data can be archived. Data mining can be used to create a baseline for production (typical harvest weights for a particular strain, by a certain grower) and used to predict upcoming harvest data and timing of available cannabis.

Referring collectively to FIGS. 1, 3, 4, and 26, at process 302, if the authentication module 224 does not validate a user, the method 300 can proceed to process 312. At process 312, a public portal 262 can be provided upon the display 108 of the client device 100. The public portal 262 can include a review control 288 configured to provide a review object 290, responsive to receiving input. The review object 290 can provide strain objects 292 a listing of the top strains of cannabis listed by name and each color coded by the type of strain based, i.e., the sales information for the strains can be automatically accessed. For example, strain objects 292 corresponding to sativa plants can be color coded yellow, hybrid plants can be color coded green, indica plants can be color coded purple, and edibles can be color coded red. When hover or section input is received by one of the strain objects 292, an informational object 294 can be provided. The informational object 294 can provide further details regarding the selected cannabis plant. As shown, informational object 294 can provide links to a description of the origin and history of the cannabis item, a cumulative user rating, uses and side effects, verified detailed compound analysis, a rating inputs for submitting a rating and review. Accordingly, the review object 290 can collect and display user reviews that can be associated with particular strains, core codes 208, label codes 216, or combinations thereof. The review object 290 can include a location control 296 configured to detect the location or receive input indicative of the location of the client device 100 and provide a listing of nearby dispensaries. Each listed dispensary can be provided with a listing of the strains on hand and location information. Other social media functions, such user commitment/review programs, forums, etc., may also be provided and accessed from the public portal 262. The public portal 262 can include a symptom evaluation control 296 configured to provide surveys and videos for identifying symptoms of conditions that can be treated by a controlled item 20 such as, for example cannabis.

It should now be understood that the embodiments described herein address at least four primary concerns for cannabis cultivation and distribution, which include determining whether a strain is accurately represented and safe, whether a strain has been grown in one of an approved location, whether all of the cannabis have been grown legally, and where have all the plants stayed in the approved locations. Additionally, the systems described herein can be implemented without requiring grow facilities or dispensaries to purchase expensive equipment. For example, client devices with network access and running an appropriate application can leverage the functionality of a cloud computing device. For example, the label codes described herein can be readable by a camera associated with portable computing devices such as, for example, smart phones, tablets, or any other device to track particular cannabis strains as well as when and where it was grown.

The systems and methods provided herein include security measures. Unique codes can be geographically date tagged with genetic markers. For growers, accurate plant count can be managed throughout the entire growth cycle. Security issues and event logs can be embedded in the growth cycle. Predictive red flags can be implemented by a cloud based device. For instance, if 53 lbs. of Kosher Kush from Region #6 is shown in inventory of 3 dispensaries but only 50 lbs. is known to be grown for use in the locality, an alert can be issued. Audits can be done with genetic samples sent to the lab for verification. The original embedded genetic markers can be be tested against the new samples to resolve the discrepancy. An expanded, similar system can be used for tracking hemp, extracts and infusions. When fully utilized, an effective, secure, real time inventory summary can be created. With early adoption a comprehensive baseline can be established for each individual grow facility and, subsequently, an entire locality (e.g., state).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for tracking a controlled item, the method comprising:
providing a tracking server comprising one or more processors communicatively coupled to memory having a first memory partition and a second memory partition, wherein the first memory partition is segregated from the second memory partition;
transforming with a cryptographic hash function, automatically with the one or more processors, a code comprising a genetic code of a strain of a controlled item into a core code;
storing the code on the first memory partition and the core code on the second memory partition;
associating the core code with a label code and a weight on the first memory partition, wherein the weight is indicative of a produced amount of the strain of the controlled item;
receiving an image of a label having an identification portion indicative of the label code and dispensed weight data;
extracting, automatically with the one or more processors, the label code from the identification portion of the image of the label;
reducing, automatically with the one or more processors, the weight associated with the core code based upon the dispensed weight data;
receiving a prior image of the label and location data indicative of a location of a client device; and
associating the core code with an entity, when the location data matches location information associated with the entity.

2. The method of claim 1, wherein the genetic code comprises a Deoxyribonucleic acid sequence of short term repeat loci.

3. The method of claim 1, wherein the label code is randomly serialized.

4. The method of claim 1, wherein the label code is encoded with a cyclic redundancy code.

5. The method of claim 1, comprising performing a cyclic redundancy check on the label code extracted from the identification portion of the image of the label.

6. The method of claim 1, wherein the code comprises chemical composition information.

7. A system for tracking a controlled item comprising:
a tracking server comprising one or more processors communicatively coupled to memory; and
one or more client device communicatively coupled to the tracking server, wherein the one or more processors of the tracking server executes machine readable instructions to:
transform with a cryptographic hash function a code comprising a genetic code of a strain of a controlled item into a core code;
receive from the one or more client device an image of a label having an identification portion indicative of a label code;
receive from the one or more client device phase data indicative of a life cycle phase of the strain of the controlled item and quantity data indicative of an amount of the strain of the controlled item;
extract the label code from the identification portion of the image of the label;
associate the core code with the label code, the first phase data, and the first quantity data on the memory;
receive from the one or more client device subsequent phase data indicative of a subsequent life cycle phase of the strain of the controlled item and subsequent quantity data indicative of a subsequent amount of the strain of the controlled item;
receive biometric input indicative of a user; and validate the client device, when the biometric input matches biometric data associated with a grower, wherein the core code is associated with the label code, the first phase data, and the first quantity data only while the client device is validated.

8. The system of claim 7, wherein the one or more client device is a smart phone or a tablet.

9. The system of claim 7, wherein the one or more processors of the tracking server executes the machine readable instructions to generate the label code, wherein the label code is randomly serialized.

10. The system of claim 9, wherein the label code comprises a cyclic redundancy code.

11. The system of claim 9, wherein the label code is generated prior to the core code.

12. The system of claim 7, wherein the one or more processors of the tracking server executes the machine readable instructions to:
receive detected location data indicative of a location of the client device; and
validate the client device, when the detected location data matches location information associated with a grower, wherein the core code is associated with the label code, the first phase data, and the first quantity data only while the client device is validated.

13. The system of claim 7, wherein the one or more processors of the tracking server executes the machine readable instructions to:
receive an explanation of the subsequent quantity data;
store the explanation in memory; and
associate the alert and the explanation with the core code.

14. The system of claim 7, wherein the code comprises chemical composition information.

15. The system of claim 7, wherein the genetic code comprises a Deoxyribonucleic acid sequence of short term repeat loci.

16. A method for tracking a controlled item, the method comprising:
providing a tracking server comprising one or more processors communicatively coupled to memory having a first memory partition and a second memory partition, wherein the first memory partition is segregated from the second memory partition;
transforming with a cryptographic hash function, automatically with the one or more processors, a code comprising a genetic code of a strain of a controlled item into a core code;
storing the code on the first memory partition and the core code on the second memory partition;
associating the core code with a label code and a weight on the first memory partition, wherein the weight is indicative of a produced amount of the strain of the controlled item;
receiving an image of a label having an identification portion indicative of the label code and dispensed weight data, wherein the label is generated prior to the core code;
extracting, automatically with the one or more processors, the label code from the identification portion of the image of the label; and
reducing, automatically with the one or more processors, the weight associated with the core code based upon the dispensed weight data.

* * * * *